(12) United States Patent
Ding et al.

(10) Patent No.: US 11,798,162 B2
(45) Date of Patent: Oct. 24, 2023

(54) SKIN DETECTION METHOD AND ELECTRONIC DEVICE

(71) Applicant: Honor Device Co., Ltd., Guangdong (CN)

(72) Inventors: Xin Ding, Beijing (CN); Chen Dong, Shenzhen (CN); Hongwei Hu, Beijing (CN); Yongtao Jiang, Shenzhen (CN); Wenmei Gao, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 457 days.

(21) Appl. No.: 17/260,875

(22) PCT Filed: Sep. 18, 2018

(86) PCT No.: PCT/CN2018/106232
§ 371 (c)(1),
(2) Date: Jan. 15, 2021

(87) PCT Pub. No.: WO2020/015147
PCT Pub. Date: Jan. 23, 2020

(65) Prior Publication Data
US 2021/0279445 A1     Sep. 9, 2021

(30) Foreign Application Priority Data
Jul. 16, 2018  (CN) .................... 201810775975.X

(51) Int. Cl.
*G06T 7/00*     (2017.01)
*G06V 40/16*    (2022.01)
(Continued)

(52) U.S. Cl.
CPC ............ *G06T 7/0012* (2013.01); *G06F 18/25* (2023.01); *G06V 10/28* (2022.01); *G06V 10/48* (2022.01);
(Continued)

(58) Field of Classification Search
CPC ........................................... G06T 2207/30201
See application file for complete search history.

(56) References Cited

U.S. PATENT DOCUMENTS 7,358,988 B1   4/2008  Konishi et al.
9,317,970 B2 * 4/2016  Beeler ..................... G06T 19/00
(Continued)

FOREIGN PATENT DOCUMENTS

CN       106469302 A    3/2017
CN       106529429 A    3/2017
(Continued)

*Primary Examiner* — Gandhi Thirugnanam
(74) *Attorney, Agent, or Firm* — Conley Rose, P.C.

(57) ABSTRACT

A skin detection method includes: dividing a region of interest in a face image into a highlighted region and a non-highlighted region; separately determining a first segmentation threshold of the highlighted region and a second segmentation threshold of the non-highlighted region; obtaining a binary image of the highlighted region based on the first segmentation threshold, and obtaining a binary image of the non-highlighted region based on the second segmentation threshold; fusing the binary image of the highlighted region and the binary image of the non-highlighted region; and identifying, based on a fused image, pores and/or blackheads included in the region of interest.

20 Claims, 18 Drawing Sheets

(51) Int. Cl.
  *G06F 18/25* (2023.01)
  *G06V 10/80* (2022.01)
  *G06V 10/48* (2022.01)
  *G06V 10/50* (2022.01)
  *G06V 10/28* (2022.01)
  *G06V 40/10* (2022.01)

(52) U.S. Cl.
  CPC ............ *G06V 10/50* (2022.01); *G06V 10/803* (2022.01); *G06V 40/10* (2022.01); *G06V 40/161* (2022.01); *G06V 40/171* (2022.01)

(56) References Cited

U.S. PATENT DOCUMENTS

| | | |
|---|---|---|
| 10,016,046 B2 | 7/2018 | Edgar et al. |
| 2007/0236567 A1 | 10/2007 | Pillman et al. |
| 2011/0002506 A1* | 1/2011 | Ciuc .................. H04N 1/62 |
| | | 382/103 |
| 2011/0211754 A1 | 9/2011 | Litvak et al. |
| 2013/0329079 A1* | 12/2013 | Florea .................. G06T 5/002 |
| | | 348/222.1 |
| 2017/0103519 A1 | 4/2017 | Zlotnick |
| 2017/0270350 A1* | 9/2017 | Maltz .................. A61B 5/7275 |
| 2020/0065998 A1* | 2/2020 | Dissanayake ............ G06T 7/90 |
| 2021/0279445 A1* | 9/2021 | Ding .......................... G06T 7/11 |
| 2021/0350556 A1* | 11/2021 | Dissanayake ............ G06T 7/44 |
| 2021/0390688 A1* | 12/2021 | Hu .......................... G06T 5/002 |

FOREIGN PATENT DOCUMENTS

| | | |
|---|---|---|
| CN | 106650728 A | 5/2017 |
| CN | 106983493 A | 7/2017 |
| CN | 107392858 A | 11/2017 |
| CN | 107424167 A | 12/2017 |
| JP | 2001054013 A | 2/2001 |
| WO | 2007022095 A1 | 2/2007 |

* cited by examiner

SKIN DETECTION METHOD AND ELECTRONIC DEVICE

CROSS-REFERENCE TO RELATED APPLICATIONS

This application is a National Stage of International Application No. PCT/CN2018/106232, filed on Sep. 18, 2018, which claims priority to Chinese Patent Application No. 201810775975.X, filed on Jul. 16, 2018, both of which are hereby incorporated by reference in their entireties.

TECHNICAL FIELD

This application relates to the field of image processing technologies, and in particular, to a skin detection method and an electronic device.

BACKGROUND

Objective detection and evaluation of a facial skin status play an important role in the booming cosmetics and skincare market. Currently, a facial skin status is usually detected and evaluated by analyzing a face image by using a specialized detection device. Specialized detection devices are relatively expensive, are usually used by professional organizations, and are unsuitable for ordinary people.

Nowadays, mobile terminal-based skin detection becomes possible owing to improved imaging capabilities of mobile terminals, so that ordinary people can detect a skin status by using mobile terminals.

Facial detection includes blackhead detection and pore detection. Currently, when a mobile terminal is used to detect blackheads and pores, a detection manner used is as follows: A captured face image is converted to specific color space, threshold-based global segmentation is then performed, and connected component analysis is performed, to select, as a detection result, a feature that meets a specified size. The captured face image is prone to be affected by a photographing environment factor such as a lighting condition. Therefore, it is relatively difficult to obtain a proper global threshold. This further affects a segmentation result, causing a relatively large error in the detection result.

SUMMARY

Embodiments of this application provide a skin detection method and an electronic device, to resolve an existing problem that there is a relatively large error in a detection result due to a lighting condition.

According to a first aspect, an embodiment of this application provides a skin detection method, including: obtaining a region of interest in a face image; dividing the region of interest into a highlighted region and a non-highlighted region; separately determining a first segmentation threshold of the highlighted region and a second segmentation threshold of the non-highlighted region; obtaining a binary image of the highlighted region based on the first segmentation threshold, and obtaining a binary image of the non-highlighted region based on the second segmentation threshold; fusing the binary image of the highlighted region and the binary image of the non-highlighted region; and identifying, based on a fused image, pores and/or blackheads included in the region of interest.

According to the solution provided in this embodiment of this application, the region of interest is divided into two regions based on a facial lighting condition, and segmentation thresholds corresponding to the two regions are determined respectively. This improves detection accuracy, in comparison with a solution in which only one global threshold is used for an image.

In a possible design of the first aspect, the dividing the region of interest into a highlighted region and a non-highlighted region includes: performing first graying processing on the region of interest to obtain a first grayscale image; performing binarization processing on the first grayscale image to obtain a binary image of the first grayscale image; performing connected component analysis on the binary image of the first grayscale image to obtain at least one first connected component; and filtering out a connected component, of the at least one first connected component, whose area is less than a first preset threshold, to obtain the highlighted region, where a region other than the highlighted region in the region of interest is the non-highlighted region.

The foregoing design provides a simple manner for locating the highlighted region and the non-highlighted region.

In a possible design of the first aspect, the performing first graying processing on the region of interest to obtain a first grayscale image includes: multiplying a pixel value of a $k^{th}$ pixel included in the region of interest by a weight value corresponding to the $k^{th}$ pixel, where the weight value corresponding to the $k^{th}$ pixel is determined based on a corresponding grayscale value of the $k^{th}$ pixel in a second grayscale image of the region of interest, the second grayscale image of the region of interest is obtained by performing grayscale transformation on the region of interest, k takes all positive integers less than L, and L is a quantity of pixels included in the region of interest; performing grayscale transformation on an image that is obtained by multiplying each pixel included in the region of interest by a corresponding weight value, to obtain a third grayscale image; performing min-max normalization on the third grayscale image that is obtained through the transformation; and performing grayscale inversion processing on the third grayscale image that is obtained through the min-max normalization, to obtain the first grayscale image.

According to the foregoing design, the graying processing outlines the highlighted region, so that a degree of distinction between the highlighted region and the non-highlighted region is increased, thereby further improving accuracy in detecting pores or blackheads.

In a possible design of the first aspect, the performing connected component analysis on the binary image of the first grayscale image to obtain at least one first connected component includes: performing expansion and/or corrosion processing on the binary image of the first grayscale image; and obtaining at least one first connected component in the binary image that has undergone the expansion and/or corrosion processing.

According to the foregoing design, expansion and/or corrosion processing is performed on a binary image of a grayscale image, thereby smoothing a boundary of each first connected component.

In a possible design of the first aspect, the determining a first segmentation threshold of the highlighted region includes: performing fourth graying processing on the region of interest to obtain a fourth grayscale image, and obtaining a minimum grayscale value of an $i^{th}$ pixel included in the highlighted region in the fourth grayscale image and N neighboring pixels of the $i^{th}$ pixel, where i takes all positive integers less than or equal to M1, M1 is a quantity of pixels included in the highlighted region, and N is equal to a multiple of 4; and using an average value of M1 obtained minimum grayscale values as the first segmentation threshold.

According to the foregoing design, the first segmentation threshold of the highlighted region is determined. This is conducive to improving accuracy in detecting pores or blackheads.

In a possible design of the first aspect, the determining a second segmentation threshold of the non-highlighted region includes: performing fourth graying processing on the region of interest to obtain a fourth grayscale image, and obtaining a minimum grayscale value of a $j^{th}$ pixel included in the non-highlighted region in the fourth grayscale image and N neighboring pixels of the $j^{th}$ pixel, where j takes all positive integers less than or equal to M2, and M2 is a quantity of pixels included in the non-highlighted region; and using an average value of the M2 obtained minimum grayscale values as the second segmentation threshold.

According to the foregoing design, the first segmentation threshold of the non-highlighted region is determined. This is conducive to improving accuracy in detecting pores or blackheads.

In a possible design of the first aspect, the identifying, based on a fused image, pores and/or blackheads included in the region of interest includes: performing corrosion and/or expansion processing on the fused image, and identifying, based on the fused image that has undergone the corrosion and/or expansion processing, the pores and/or the blackheads included in the region of interest.

According to the foregoing design, the fused image can be smoothed by performing the corrosion and/or expansion processing on the fused image.

In a possible design of the first aspect, the identifying, based on a fused image, pores and/or blackheads included in the region of interest includes: removing a nose shadow region from the fused image; and determining, based on the fused image from which the nose shadow region is removed, the pores and/or the blackheads included in the region of interest.

In a possible design of the first aspect, the nose shadow region is located in the following manner; performing fourth graying processing on the region of interest to obtain a fourth grayscale image, and performing binarization processing on the fourth grayscale image to obtain a binary image of the fourth grayscale image; performing connected component analysis on the binary image of the fourth grayscale image to obtain at least one second connected component; and filtering out a connected component, of the at least one second connected component, whose area is less than a second preset threshold, to obtain the nose shadow region.

False detection of pores or blackheads in the nose shadow region occurs frequently. Therefore, according to the foregoing design, the nose shadow region is located, and the nose shadow region is removed from the region of interest before blackheads and pores are determined, thereby reducing a false detection rate.

In a possible design of the first aspect, the performing connected component analysis on the binary image of the fourth grayscale image to obtain at least one second connected component includes: performing expansion and/or corrosion processing on the binary image of the fourth grayscale image; and obtaining at least one second connected component in the binary image, of the fourth grayscale image, that has undergone the expansion and/or corrosion processing.

In a possible design of the first aspect, the performing fourth graying processing on the region of interest to obtain a fourth grayscale image includes: performing grayscale transformation on the region of interest to obtain the second grayscale image, performing min-max normalization on the second grayscale image; performing Gaussian differential filtering on the second grayscale image that has undergone the min-max normalization, to obtain a filtered image; performing min-max normalization on the filtered image; and obtaining a histogram of the filtered image that has undergone the min-max normalization, and based on the histogram of the filtered image, setting a grayscale value of a first type of pixels in the filtered image to 0, and setting a grayscale value of a second type of pixels in the filtered image to 255, where the grayscale value of the first type of pixels is less than or equal to a minimum grayscale value of other pixels in the filtered image, a percentage of a quantity of the first type of pixels in a total quantity of pixels in the filtered image is a %, a grayscale value of the second type of pixels is greater than or equal to a maximum grayscale value of other pixels in the filtered image, a percentage of a quantity of the second type of pixels in the total quantity of pixels in the filtered image is b %, and a and b are both positive integers. This is conducive to improving accuracy in detecting blackheads or pores.

In a possible design of the first aspect, the identifying, based on a fused image, pores and/or blackheads included in the region of interest includes: obtaining at least one third connected component included in the fused image, and obtaining a parameter corresponding to each third connected component, where the parameter includes at least one of the following: a radius, a degree of circularity, and an internal-external color variation value; and identifying, based on the parameter corresponding to each third connected component, whether a location corresponding to the third connected component is a pore or a blackhead, where the degree of circularity is used to represent a degree of similarity between a shape of the third connected component and a circle, and the internal-external color variation value is a difference or a ratio between an internal pixel value and an external pixel value that correspond to the third connected component at a location of the region of interest. This is conducive to improving accuracy in detecting blackheads or pores.

In a possible design of the first aspect, the method further includes: processing an image corresponding to identified pores to obtain a quantized pore indicator; calculating a quantized pore score of the region of interest based on the quantized pore indicator; and displaying the quantized pore score, where: the quantized pore indicator includes at least one of the following: a pore area ratio, a pore density, an average pore internal-external color variation value, and a ratio of a pore internal-external color variation value-weighted area; and the pore area ratio is a ratio of a total area of pores included in the region of interest to an area of the region of interest, the pore density is a ratio of a quantity of pores included in the region of interest to the area of the region of interest, the average pore internal-external color variation value is an average value of internal-external color variation values of the pores included in the region of interest, and the ratio of the pore internal-external color variation value-weighted area is a ratio, to the area of the region of interest, of a sum that is obtained by adding all values obtained by multiplying, by a corresponding area, an internal-external color variation value of each pore included in the region of interest.

In a possible design of the first aspect, the method further includes: processing an image corresponding to identified blackheads to obtain a quantized blackhead indicator; calculating a quantized blackhead score of the region of interest based on the quantized blackhead indicator; and displaying the quantized blackhead score, where: the quantized blackhead indicator includes at least one of the following: a blackhead area ratio, a blackhead density, an average blackhead internal-external color variation value, and a ratio of a blackhead internal-external color variation value-weighted area; and the blackhead area ratio is a ratio of a total area of blackheads included in the region of interest to the area of the region of interest, the blackhead density is a ratio of a quantity of blackheads included in the region of interest to the area of the region of interest, the average blackhead internal-external color variation value is an average value of internal-external color variation values of the blackheads included in the region of interest, and the ratio of the blackhead internal-external color variation value-weighted area is a ratio, to the area of the region of interest, of a sum that is obtained by adding all values obtained by multiplying, by a corresponding area, an internal-external color variation value of each blackhead included in the region of interest.

Quantized scores are determined by using indicators of a plurality of dimensions. This is more professional and scientific in comparison with an existing method of calculating a quantized score by using only an area.

Based on a same inventive concept as the first aspect, according to a second aspect, an embodiment of this application provides a skin detection apparatus, including a unit for performing the method according to any one of the first aspect or the designs of the first aspect.

According to a third aspect, an embodiment of this application provides an electronic device, including a processor and a memory. The processor is coupled to the memory, the memory is configured to store a program instruction, and the processor is configured to read the program instruction stored in the memory, to implement the method according to any one of the first aspect or the possible designs of the first aspect.

According to a fourth aspect, an embodiment of this application provides a computer storage medium. The computer storage medium stores a program instruction. When the program instruction is run on an electronic device, the electronic device is enabled to perform the method according to any one of the first aspect or the possible designs of the first aspect.

According to a fifth aspect, an embodiment of this application provides a computer program product. When the computer program product runs on an electronic device, the electronic device is enabled to perform the method according to any one of the first aspect or the possible designs of the first aspect.

According to a sixth aspect, an embodiment of this application provides a chip. The chip is coupled to a memory in an electronic device, and performs the method according to any one of the first aspect or the possible designs of the first aspect.

In addition, for the technical effects produced by the second aspect to the sixth aspect, refer to the descriptions in the first aspect. Details are not described herein again.

It should be noted that in the embodiments of this application, "coupling" means direct or indirect mutual combination between two parts.

DESCRIPTION OF EMBODIMENTS

Embodiments disclosed in this application can be applied to an electronic device. In some embodiments of this application, the electronic device may be a portable electronic device including a function such as a personal digital assistant and/or a music player, for example, a mobile phone, a tablet computer, a wearable device (such as a smart watch) with a wireless communication function, or a vehicle-mounted device. An example embodiment of a portable electronic device includes but is not limited to a portable electronic device using iOS® %, Android® Microsoft®, or another operating system. The foregoing portable electronic device may alternatively be a laptop computer (Laptop) having a touch-sensitive surface (for example, a touch panel), or the like. It should also be understood that, in some other embodiments of this application, the electronic device may alternatively be a desktop computer that having a touch-sensitive surface (for example, a touch panel).

Figure 1:
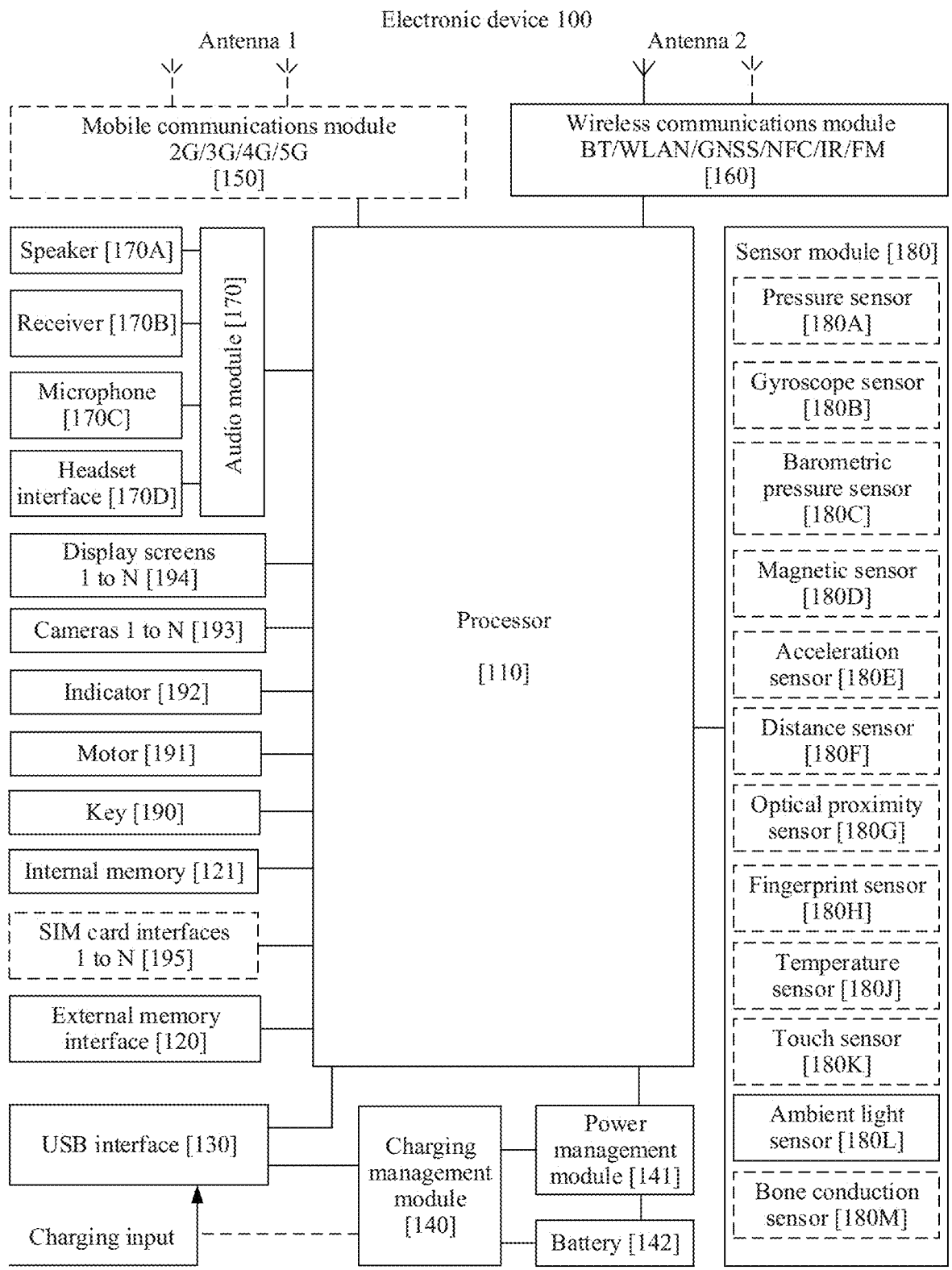
FIG. 1 is a schematic structural diagram of an electronic device according to an embodiment of this application.

FIG. 1 is a schematic structural diagram of an electronic device 100.

The electronic device 100 may include a processor 110, an external memory interface 120, an internal memory 121, a universal serial bus (universal serial bus, USB) interface 130, a charging management module 140, a power management module 141, a battery 142, an antenna 2, a wireless communications module 160, an audio module 170, a speaker 170A, a receiver 170B, a microphone 170C, a headset interface 170D, a sensor module 180, a key 190, a motor 191, an indicator 192, a camera 193, a display screen 194, and the like. The sensor module 180 includes an ambient light sensor 180L. In addition, the sensor module 180 may further include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, a bone conduction sensor 180M, and the like. In some other embodiments, the electronic device 100 in this embodiment of this application may further include an antenna 1, a mobile communications module 150, a subscriber identity module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

In some embodiments, the processor 110 may further be provided with a memory, configured to store an instruction and data. For example, the memory in the processor 110 may be a cache memory. The memory may store an instruction or data recently used or cyclically used by the processor 110. If the processor 110 needs to use the instruction or data again, the processor 110 may directly invoke the instruction or data from the memory. This avoids repeated access and reduces a waiting time of the processor 110, thereby improving system efficiency.

In some other embodiments, the processor 110 may further include one or more interfaces. For example, the interface may be a (universal serial bus, USB) interface 130. For another example, the interface may alternatively be an inter-integrated circuit (inter-integrated circuit, 12C) interface, an inter-integrated circuit sound (inter-integrated circuit sound, 12S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general purpose input/output (general-purpose input/output, GPIO) interface, or a subscriber identity module (subscriber identity module, SIM) interface. It can be understood that in this embodiment of this application, different modules of the electronic device 100 may be connected through interfaces, so that the electronic device 100 can implement different functions, such as photographing and processing. It should be noted that a connection manner of the interfaces in the electronic device 100 is not limited in this embodiment of this application.

The USB interface 130 is an interface compliant with a USB standard specification. For example, the USB interface 130 may include a mini USB interface, a micro USB interface, a USB type C interface, and the like. The USB interface 130 may be configured to connect to a charger to charge the electronic device 100, may also be configured to transmit data between the electronic device 100 and a peripheral device, and may also be configured to connect to a headset, to play audio through the headset. The interface may further be configured to connect to another electronic device, such as an AR device.

The charging management module 140 is configured to receive a charging input from the charger. The charger may be a wireless charger, or may be a wired charger. In some wired charging embodiments, the charging management module 140 may receive a charging input from a wired charger through the USB interface 130. In some wireless charging embodiments, the charging management module 140 may receive a wireless charging input from a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives an input and/or inputs from the battery 142 and/or the charging management module 140, to supply power to the processor 110, the internal memory 121, an external memory, the display screen 194, the camera 193, the wireless communications module 160, and the like. The power management module 141 may further be configured to monitor parameters such as a battery capacity, a quantity of battery circles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be reused, to improve antenna utilization. For example, the antenna 1 may be reused as a diversity antenna of a wireless local area network. In some other embodiments, an antenna may be used in combination with a tuning switch.

The mobile communications module 150 may provide a wireless communication solution applied to the electronic device 100, including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1; perform filtering, amplification, and other processing on the received electromagnetic wave; and transfer a processed electromagnetic wave to the modem processor for demodulation. The mobile communications module 150 may further amplify a signal modulated by the modem processor, convert an amplified signal into an electromagnetic wave by using the antenna 1, and radiate the electromagnetic wave through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low frequency baseband signal into an intermediate frequency or high frequency signal. The modulator is configured to demodulate a received electromagnetic wave signal into a low frequency baseband signal. Then the demodulator transfers the low frequency baseband signal obtained through demodulation to the baseband processor for processing. The low frequency baseband signal is transferred to the application processor after being processed by the baseband processor. The application processor outputs a voice signal through an audio device (including but not limited to the speaker 170A and the receiver 170B), or displays an image or a video through the display screen 194. In some embodiments, the modem processor may be an independent device. In some other embodiments, the modem processor may be independent of the processor 110, and is disposed in a same device as the mobile communications module 150 or another function module.

The wireless communications module 160 may provide wireless communication solutions that are applied to the electronic device 100, for example, wireless local area network (wireless local area networks, WLAN)(such as wireless fidelity (wireless fidelity, Wi-Fi) network), bluetooth (bluetooth. BT), global navigation satellite system (global navigation satellite system, GNSS), frequency modulation (frequency modulation, FM), near field communication (near field communication, NFC), and infrared (infrared, IR) technologies. The wireless communications module 160 may be one or more devices integrated with at least one communication processing module. The wireless communications module 160 receives an electromagnetic wave signal through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification processing on the to-be-sent signal, convert a processed to-be-sent signal into an electromagnetic wave by using the antenna 2, and radiate the electromagnetic wave through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include global system for mobile communications (global system for mobile communications, GSM), general packet radio service (general packet radio service. GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR, and/or other technologies. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite-based augmentation systems, SBAS).

The electronic device 100 implements a display function by using the GPU, the display screen 194, and the application processor The GPU is a microprocessor for image processing, and is connected to the display screen 194 and the application processor. The GPU is configured to perform mathematical and geometric calculation, and is configured to perform graphics rendering. The processor 110 may include one or more GPUs, and execute a program instruction to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like. In some embodiments, the electronic device 100 may include one or N display screens 194, where N is a positive integer greater than 1.

The electronic device 100 may implement a photographing function by using the ISP, the camera 193, the video codec, the GPU, the display screen 194, the application processor, and the like.

The ISP is configured to process data fed back by the camera 193. For example, during photographing, after the shutter is opened, light is transferred to a photosensitive element of the camera, an optical signal is converted into an electrical signal, and the photosensitive element of the camera transfers the electrical signal to the ISP for processing, to convert the electrical signal into an image visible to human eyes. The ISP may further perform algorithm-based optimization on the image in terms of noise, brightness, and skin color. The ISP may further optimize parameters such as an exposure and a color temperature of a photographing scenario. In some embodiments, the ISP may be disposed in the camera 193.

The camera 193 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS)-based phototransistor. The photosensitive element converts an optical signal into an electrical signal, and transfers the electrical signal to the ISP to be converted into a digital image signal. The ISP outputs the digital image signal to the DSP for processing. The DSP converts the digital image signal into an image signal in a standard RGB or YUV format or the like. In some embodiments, the electronic device 100 may include one or N cameras 193, where N is a positive integer greater than 1.

The digital signal processor is configured to process a digital signal. The digital signal processor not only can process the digital image signal, but also can process another digital signal. For example, when the electronic device 100 selects a frequency, the digital signal processor is configured to perform Fourier transformation on frequency energy, or the like.

The video codec is configured to compress or decompress a digital video. The electronic device 100 can support one or more types of video codecs. In this way, the electronic device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computation processor that rapidly processes input information by using a biological neural network structure, for example, by using a mode of transfer between human brain neurons, and may further perform continuous self-learning. Applications such as intelligent cognition of the electronic device 100, for example, image recognition, facial recognition, voice recognition, and text understanding, can be implemented by using the NPU.

The external memory interface 120 may be configured to connect to an external memory card (for example, a micro SD card), to expand a storage capability of the electronic device 100. The external memory card communicates with the processor 110 through the external memory interface 120, to implement a data storage function, for example, to store music, video, and other files in the external memory card.

The internal memory 121 may be configured to store computer executable program code, where the executable program code includes an instruction. The processor 110 runs the instruction stored in the internal memory 121, to perform various function applications and data processing of the electronic device 100. The internal memory 121 may include a program storage area and a data storage area. The program storage area may store an operating system, an application program required by at least one function (for example, a voice playing function or an image playing function), and the like. The data storage area may store data (for example, audio data, a phone book, and the like) created during use of the electronic device 100 and other data. In addition, the internal memory 121 may include a high-speed random access memory, and may further include a non-volatile memory, such as at least one magnetic disk storage device, at least one flash memory device, and at least one universal flash storage (universal flash storage, UFS).

The electronic device 100 may implement an audio function, such as music playing and recording, by using the audio module 170, the speaker 170A, the receiver 170B, the microphone 170C, the headset interface 170D, the application processor, and the like.

The audio module 170 is configured to convert digital audio information into an analog audio signal output, and is also configured to convert an analog audio input into a digital audio signal. The audio module 170 may further be configured to encode and decode an audio signal. In some embodiments, the audio module 170 may be disposed in the processor 110, or some function modules of the audio module 170 may be disposed in the processor 110.

The speaker 170A, also referred to as a "loudspeaker", is configured to convert an electrical audio signal into a voice signal. The electronic device 100 may be used for listening to music or answering a hands-free call by using the speaker 170A.

The receiver 170B, also referred to as an "earpiece", is configured to convert an electrical audio signal into a voice signal. When a call or voice information is received on the electronic device 100, voice can be heard by putting the receiver 170B near a human ear.

The microphone 170C, also referred to as a "voice tube" or a "megaphone", is configured to convert a voice signal into an electrical signal. When making a call or sending voice information, a user may put the microphone 170C near the mouth and speak, to input a voice signal into the microphone 170C. The electronic device 100 may be provided with at least one microphone 170C. In some other embodiments, the electronic device 100 may be provided with two microphones 170C, which may further implement a noise reduction function in addition to voice signal collection. In some other embodiments, the electronic device 100 may alternatively be provided with three, four, or more microphones 170C, which implement voice signal collection and noise reduction, and may further identify a source of voice, to implement a directional recording function.

The headset interface 170D is configured to connect to a wired headset. The headset interface 170D may be a USB interface 130, or may be a standard 3.5 mm open mobile terminal platform (open mobile terminal platform, OMTP) interface, a standard cellular telecommunications industry association of the USA (cellular telecommunications industry association of the USA, CTIA) interface, or the like.

The pressure sensor 180A is configured to sense a pressure signal, and may convert the pressure signal into an electrical signal. In some embodiments, the pressure sensor 180A may be disposed on the display screen 194. The pressure sensor 180A may be of many types, for example, a resistive pressure sensor, an inductive pressure sensor, a capacitive pressure sensor, or the like. A capacitive pressure sensor may include at least two parallel plates that contain a conductive material. When force is exerted on the pressure sensor 180A, a capacitance between electrodes is changed. The electronic device 100 determines a strength of the pressure based on a change of the capacitance. When a touch operation is exerted on the display screen 194, the electronic device 100 detects a strength of the touch operation by using the pressure sensor 180A. The electronic device 100 may also calculate a touch position based on a signal detected by the pressure sensor 180A. In some embodiments, touch operations that are exerted on a same touch position but have different touch operation strengths may correspond to different operation instructions. For example, when a touch operation with a touch operation strength less than a first pressure threshold is exerted on an icon of an SMS message application, an instruction for viewing an SMS message is executed. When a touch operation with a touch operation strength greater than or equal to the first pressure threshold is exerted on the icon of the SMS message application, an instruction for creating an SMS message is executed.

The gyroscope sensor 180B may be configured to determine a movement posture of the electronic device 100. In some embodiments, angular velocities of the electronic device 100 relative to three axes (that is, x, y, and z axes) may be determined by using the gyroscope sensor 180B. The gyroscope sensor 180B may be configured to implement image stabilization during photographing. For example, when the shutter is pressed, the gyroscope sensor 180B detects an angle of shaking of the electronic device 100; and calculates, based on the angle, a distance that needs to be compensated by a lens module, to counteract the shaking of the electronic device 100 through a counter motion of the lens, thereby implementing image stabilization. The gyroscope sensor 180B may further be used in navigation and motion sensing gaming scenarios.

The barometric pressure sensor 180C is configured to measure an atmospheric pressure. In some embodiments, the electronic device 100 calculates an altitude based on an atmospheric pressure value measured by the barometric pressure sensor 180C, to assist in positioning and navigation.

The magnetic sensor 180D includes a Hall effect sensor. The electronic device 100 may detect opening and closing of a flip leather case by using the magnetic sensor 180D. In some embodiments, when the electronic device 100 is a flip phone, the electronic device 100 may detect opening and closing of a clamshell by using the magnetic sensor 180D. In this way, based on a detected open/closed state of the leather case or a detected open/closed state of the clamshell, attributes such as auto-unlocking when the flip phone is flipped open can be set.

The acceleration sensor 180E may detect magnitude of accelerations of the electronic device 100 in all directions (usually along three axes). When the electronic device 100 is still, the acceleration sensor 180E may detect a magnitude and a direction of gravity. The acceleration sensor 180E may further be configured to identify a posture of the electronic device, and is applied to landscape/portrait mode switching, a pedometer, and the like.

The distance sensor 180F is configured to measure a distance. The electronic device 100 may measure a distance by using an infrared or laser ray. In some embodiments, in a photographing scenario, the electronic device 100 may measure a distance by using the distance sensor 180F, to implement rapid focusing.

The optical proximity sensor 180G may include a light emitting diode (LED), an optical detector, and the like, such as a photodiode. The light emitting diode may be an infrared light emitting diode. The electronic device 100 emits infrared light by using the light emitting diode. The electronic device 100 detects reflected infrared light from a nearby object by using the photodiode. When detecting sufficient reflected light, the electronic device 100 can determine that there is an object near the electronic device 100. When detecting insufficient reflected light, the electronic device 100 can determine that there is no object near the electronic device 100. The electronic device 100 can detect, by using the optical proximity sensor 180G, that the user holds the electronic device 100 close to an ear during a call, so as to automatically turn off a screen, thereby saving power. The optical proximity sensor 180G may also be used for auto-unlocking and screen locking in a leather case mode and a pocket mode.

The ambient light sensor 180L is configured to sense brightness of ambient light. The electronic device 100 may adaptively adjust brightness of the display screen 194 based on the sensed brightness of the ambient light. The ambient light sensor 180L may also be configured to automatically adjust white balance during photographing. The ambient light sensor 180L may further be configured to detect, in coordination with the optical proximity sensor 180G, whether the electronic device 100 is in a pocket, to prevent touch by mistake.

The fingerprint sensor 180H is configured to collect a fingerprint. By using a feature of the collected fingerprint, the electronic device 100 may implement unlocking via the fingerprint, access an application lock, take a photo via the fingerprint, answer a call via the fingerprint, and the like.

The temperature sensor 180J is configured to detect a temperature. In some embodiments, the electronic device 100 detects a temperature by using the temperature sensor 180J, to execute a temperature processing policy. For example, when a temperature reported by the temperature sensor 180J exceeds a threshold, the electronic device 100 degrades performance of a processor near the temperature sensor 180J, to reduce power consumption and implement thermal protection. In some other embodiments, when a temperature is lower than another threshold, the electronic device 100 heats up the battery 142, to prevent abnormal power-off of the electronic device 100 caused by a low temperature. In some other embodiments, when a temperature is lower than still another threshold, the electronic device 100 boosts an output voltage of the battery 142, to prevent abnormal power-off caused by a low temperature.

The touch sensor 180K is also referred to as a "touch panel". The touch sensor 180K may be disposed on the display screen 194, and the touch sensor 180K and the display screen 194 form a touch screen, which is also referred to as a "touch control screen". The touch sensor 180K is configured to detect a touch operation exerted on or near the touch sensor 180K. The touch sensor may transfer the detected touch operation to the application processor, to determine a touch event type. The display screen 194 may be used to provide a visual output related to the touch operation. In some other embodiments, the touch sensor 180K may alternatively be disposed on a surface of the electronic device 100 at a different location from the display screen 194.

The bone conduction sensor 180M may obtain a vibration signal. In some embodiments, the bone conduction sensor 180M may obtain a vibration signal of a vibrating bone of a vocal-cord part of a human body. The bone conduction sensor 180M may also be in contact with pulses of the human body, to receive blood pressure fluctuating signals. In some embodiments, the bone conduction sensor 180M may alternatively be provided in a headset, to form a bone conduction headset. The audio module 170 may obtain a voice signal through parsing the vibration signal of the vibrating bone of the vocal-cord part of the human body obtained by the bone conduction sensor 180M, to implement a voice function. The application processor may obtain heart rate information through parsing the blood pressure fluctuating signals obtained by the bone conduction sensor 180M, to implement a heart rate detection function.

The key 190 may include a power on/off key, a volume key, and the like. The key 190 may be a mechanical key, or may be a touch key. The electronic device 100 may receive a key input, to generate a key signal input that is related to user setting or function control of the electronic device 100.

The motor 191 may generate a vibration alert. The motor 191 may be configured to produce an incoming call vibration alert, and may also be configured to provide a touch vibration feedback. For example, touch operations exerted on different applications (such as photographing and audio playing) may correspond to different vibration feedback effects. The motor 191 may also provide different vibration feedback effects correspondingly depending on touch operations exerted on different regions on the display screen 194. Different application scenarios (for example, time reminder, information receiving, alarm, and gaming) may also correspond to different vibration feedback effects. A touch vibration feedback effect may also be customized.

The indicator 192 may be an indicator light, may be configured to indicate a charging status and a battery level change, and may also be configured to indicate a message, a missed call, a notification, and the like.

The SIM card interface 195 is configured to connect to an SIM card. The SIM card may be inserted into the SIM card interface 195 or pulled out from the SIM card interface 195, to come into contact with or be separated from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be inserted into the same SIM card interface 195 at a same time. The plurality of cards may be of a same type or may be of different types. The SIM card interface 195 may also be compatible with different types of SIM cards. The SIM card interface 195 may also be compatible with an external memory card. The electronic device 100 interacts with a network by using the SIM card, to implement call and data communication and the like. In some embodiments, the electronic device 100 uses an eSIM card, that is, an embedded SIM card. The eSIM card may be embedded in the electronic device 100, and cannot be separated from the electronic device 100.

It can be understood that the structure illustrated in this embodiment of this application does not constitute a specific limitation on the electronic device 100. In some other embodiments of this application, the electronic device 100 may include more or fewer components than those illustrated in the figure, some components may be combined, some components may be split, or there may be a different component arrangement. The illustrated components may be implemented by hardware, software, or a combination of software and hardware.

In addition, it should be noted that in this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B each may be in a singular or plural form. The character "/" generally indicates an "or" relationship between the associated objects. "At least one (item) of the following" or a similar expression thereof means any combination of these items, including a single item or any combination of a plurality of items. For example, at least one (item) of a, b, or c may represent a, b, c, a and b, a and c, b and c, or a and b and c, where a, b, and c each may be in a singular or plural form. In addition, it should be understood that in the descriptions of this application, terms such as "first" and "second" are merely intended for distinction in description, but should not be construed as indicating or implying relative importance or indicating or implying a sequence.

The following describes the embodiments of this application in detail by using the electronic device 100 as an example.

It should be understood that in the embodiments of this application, application programs supported by the electronic device may include a photographing application, such as a camera. Moreover, the application programs supported by the electronic device may further include a plurality of other applications, such as drawing, gaming, phone, video player, music player, photo management, browser, calendar, and clock.

In the embodiments of this application, applications supported by the electronic device may further include a skin detection application. The skin detection application may detect facial skin features (for example, wrinkles, pores, blackheads, color spots, and red areas on facial skin) of a user by using a captured face image, and provide a detection result report for the user. For example, the detection result report may include, without being limited to, scores for the features of the facial skin, comprehensive analysis of the facial skin, and the like; and may further display the face image of the user and mark corresponding issues on the face image based on a detection result concerning each feature, for example, marking blackheads in a nose tip region, marking winkles in a forehead region, and marking color spots in a cheek region. It can be understood that the detection result report may be presented to the user on a user interface. For example, the detection result report may be presented on a user interface 200 shown in FIG. 2, and includes a synthesis score, a skin age, and scores for pores, blackheads, fine lines, color spots, and red areas. In some other embodiments, the user interface 200 may further include a virtual button 201, a virtual button 202, a virtual button 203, a virtual button 204, and a virtual button 205. Using the virtual button 201 as an example, the electronic device 100 displays, on the display screen 194 in response to an operation on the virtual button 201, specific care advice concerning the pores. For functions of the virtual button 202, the virtual button 203, the virtual button 204, and the virtual button 205, refer to the function of the virtual button 201. Details are not described herein again.

To enable more accurate detection of the facial skin of the user by using the electronic device, for example, in a user skin detection solution of the embodiments of this application, a photographing condition detection module, an image quality detection module, a region of interest (region of interest, ROI) detection module, a skin feature detection module, a result analysis module, and the like may be integrated into the processor 110. In some embodiments, a photographing condition detection module, an image quality detection module, a region of interest (region of interest, ROI) detection module, a skin feature detection module, a result analysis module, and the like may be integrated into the application processor in the processor 110. In some other embodiments, an artificial intelligence (artificial intelligence, AI) chip is integrated into the processor 110, and a photographing condition detection module, an image quality detection module, a region of interest (region of interest, ROI) detection module, a skin feature detection module, a result analysis module, and the like may be integrated into the AI chip, to implement user skin detection.

The photographing condition detection module may detect a current photographing condition, to guide the user to take a photo under a required photographing condition, to ensure that a captured image meets a requirement, thereby ensuring accuracy of skin detection based on the image. For example, the required photographing condition is that there is sufficient ambient light, there is proper distance (for example, approximately 25 cm) between the face and the electronic device, the face is kept in a proper posture, eyes are opened or closed, glasses should be taken off, the forehead is not covered by bangs as far as possible, a focus is correct, there is no obvious shaking, and so on.

After the photographing condition detection module detects the photographing condition successfully, the processor 110 enables smart light supplementation. For example, the photographing condition detection module determines that the detection is successful when the current photographing condition meets the requirement. Specifically, in the embodiments of this application, the electronic device may use different light supplementation modes (for example, a flash mode or a flashlight mode) to supplement light on the user face, to meet different facial skin feature detection requirements. After light is supplemented on the user face, the processor 110 may control the camera 193 to photograph the user face, to obtain a face image of the user.

The image quality detection module may detect quality of the face image, to ensure that the captured image meets different facial skin feature detection requirements.

After the image quality detection module detects that the quality of the image meets a requirement, the ROI detection module may determine a to-be-detected ROI in the face image. For example, an ROI of blackheads is a small region on the nose tip.

The skin feature detection module may separately detect facial skin features in the determined ROI, for example, detecting wrinkles, pores, blackheads, color spots, red areas, a degree of oiliness, and the like on the skin.

The result analysis module may analyze detection results, concerning the facial skin features, detected by the skin feature detection module; and provide a score, a ranking, and the like of each detection item of each skin feature.

In addition, in some embodiments, the processor 110 may further be integrated with an image preprocessing module. The image preprocessing module may perform compression, cropping, and the like on the captured face image, for the ROI detection module, the skin feature detection module, and the like to perform subsequent processing.

To output an analysis result concerning the face image or output the score and the like of each detection item, the processor 110 may further display, on the display screen 194, a detection report (including regions in which the detection results concerning the features are located on the face image, for example, marking blackheads in the nose tip region, marking winkles in the forehead region, and marking color spots in the cheek region; the score of each detection item; and the like) obtained after the detection, so that the user can view the detection report, thereby improving user experience.

The inventor discovered that during skin detection, due to uneven lighting on a face, it is relatively difficult to obtain a global threshold suitable for binarization processing. If a threshold is determined by using a dark location as a reference, too many pores or blackheads may be detected at a brighter location (due to false detection). If a threshold is determined by using a bright location as a reference, too few pores or no pores may be detected at a darker location (due to missing of detection). A value of a threshold may be affected when lighting or a posture of a person is changed slightly, thereby affecting consistency between detection results.

In view of this, the embodiments of this application provide a skin detection method and a terminal device, to detect blackheads and/or pores. An ROI region is divided into a highlighted region and a non-highlighted region based on a light reflection status on the face, and thresholds are respectively determined for the two regions for binarization processing, and then blackheads and/or pores are determined.

Figure 3A:
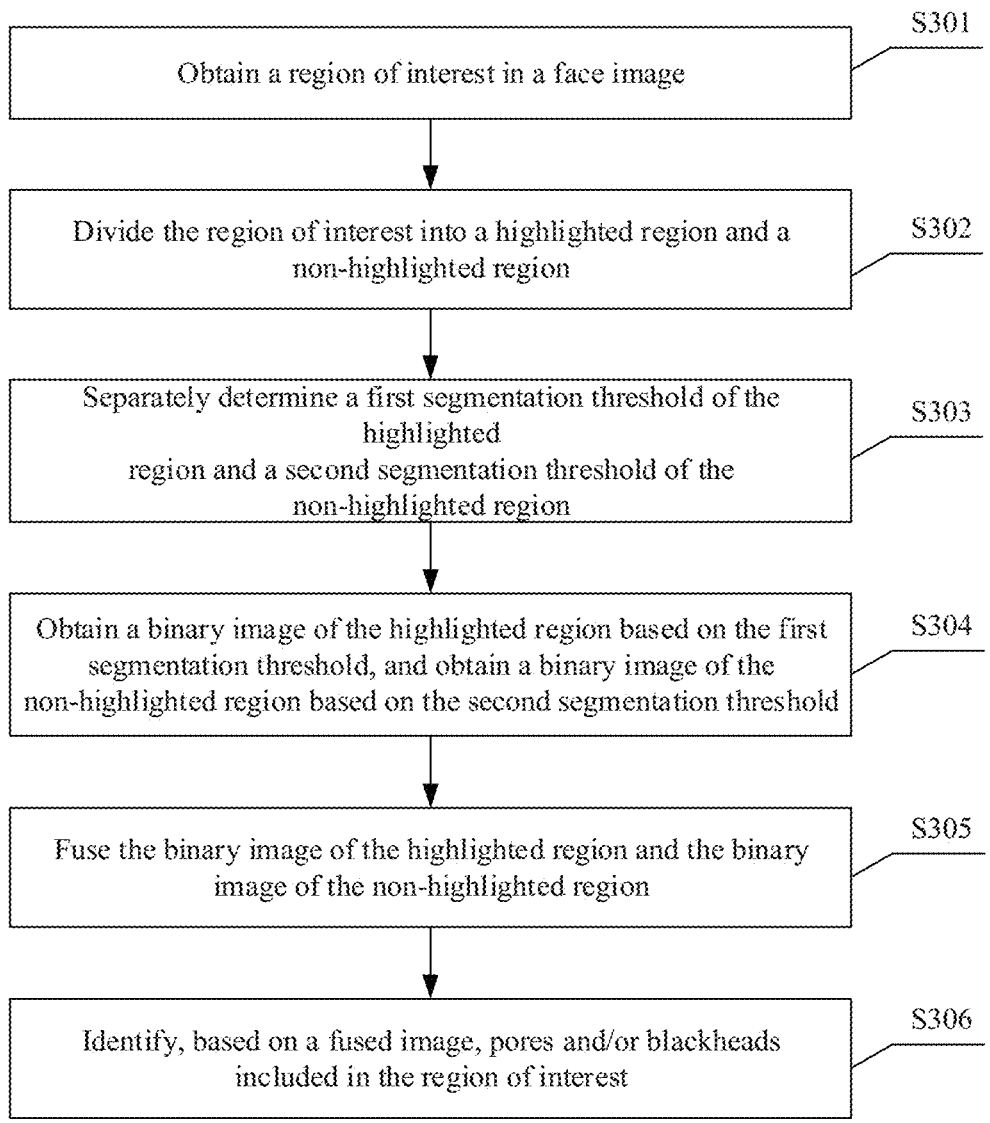
FIG. 3A is a flowchart of a skin detection method according to an embodiment of this application.

FIG. 3A is schematic flowchart of a skin detection method according to an embodiment of this application. The method includes the following steps. The skin detection method may be performed by the foregoing electronic device 100, for example, may be performed by the processor 110 in the electronic device 100.

S301. Obtain a region of interest in a face image.

Figure 3B:
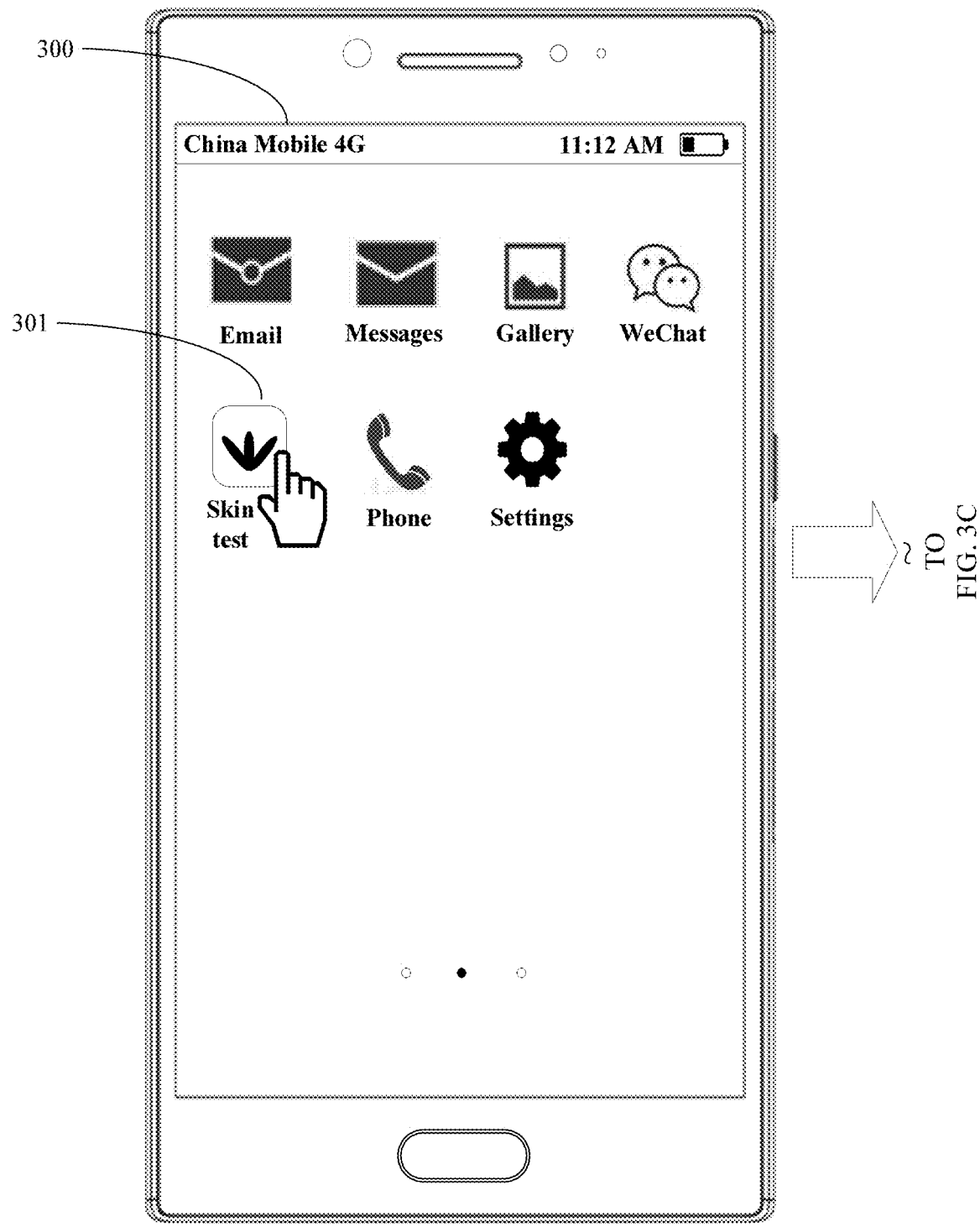
FIG. 3B to FIG. 3D are a schematic diagram of a preview user interface according to an embodiment of this application.
Figure 3C:
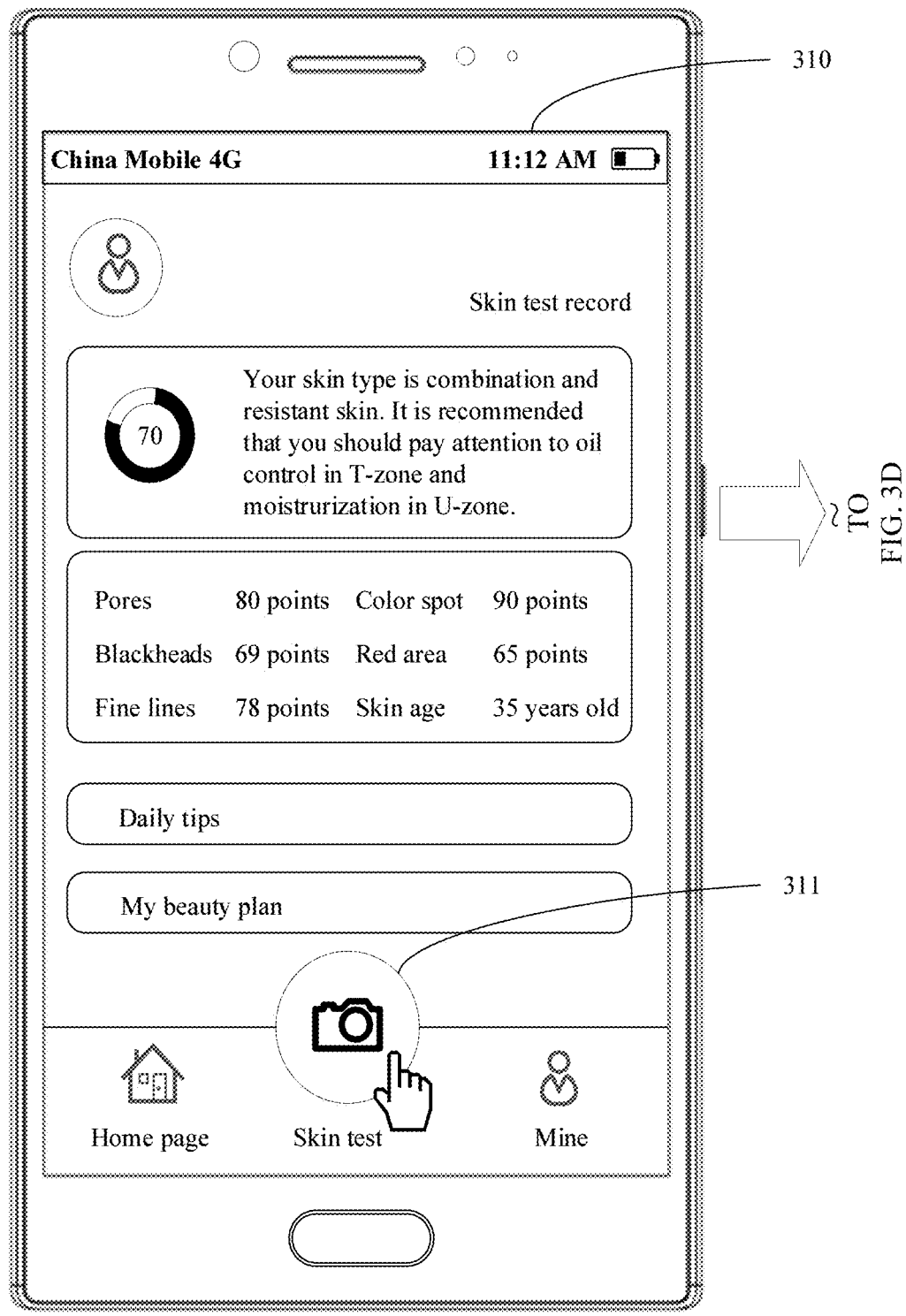
Figure 3D:
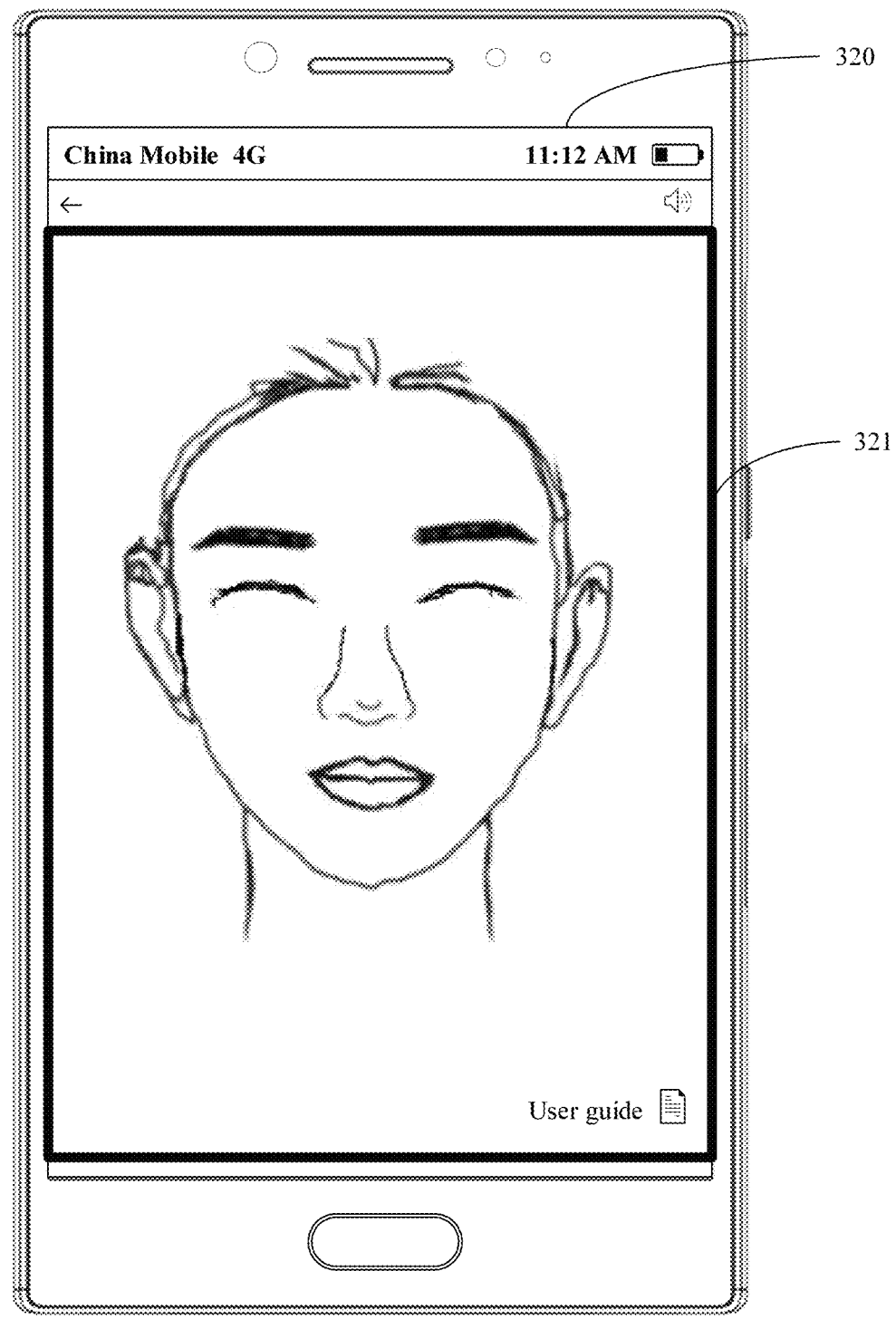

In a possible example, the skin detection method provided in this embodiment of this application can be applied to a skin test application. A face image is obtained by using the skin test application, and the skin detection method provided in this embodiment of this application is performed based on the face image. As shown in FIG. 3B to FIG. 3D, the display screen 194 of the electronic device 100 displays an icon 300 of the skin test application. When detecting an operation on the icon 300, the electronic device 100 displays, in response to the operation on the icon 300, a user interface 310 of the skin test application on the display screen 194. The user interface 310 of the skin test application includes a skin test button 311. The electronic device 100 detects an operation on the skin test button 311. In response to the operation on the skin test button 311, the display screen 194 displays a photographing preview interface 320 of a camera application. The photographing preview interface 320 is configured to display an image collected by the camera 193. For example, the photographing preview interface 320 may include a preview region 321. The preview region 321 is configured to display the image collected by the camera 193. It should be understood that the image collected by the camera 193 may be a face image of a user. In addition, the camera 193 may be a front-facing camera of the electronic device 100, or may be a rear-facing camera of the electronic device 100. In some embodiments, to improving photographing quality, if resolution of the front-facing camera is lower than that of the rear-facing camera, the camera 193 is the rear-facing camera of the electronic device 100. To further improving the photographing quality, when ambient light meets a photographing condition, the electronic device 100 automatically photographs the image collected by the camera 193, to obtain a face image. It should be noted that the skin test button 311 in this embodiment of this application may also be referred to as a photographing button, and this embodiment of this application does not limit a name of the skin test button 311.

In another possible example, the face image may alternatively be an image already stored in the electronic device.

Figure 4A:
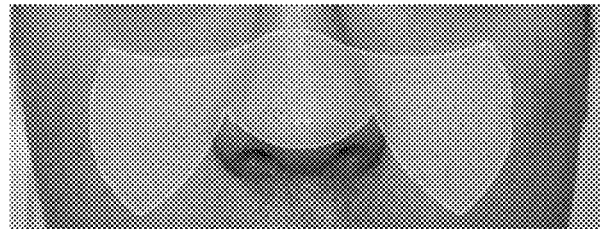
FIG. 4A is a schematic diagram of an ROI of pores according to an embodiment of this application.
Figure 4B:
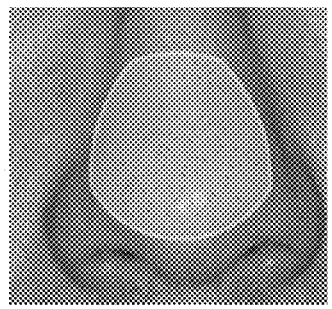
FIG. 4B is a schematic diagram of an ROI of blackheads according to an embodiment of this application.

For example, after the face image is obtained, a facial feature location method is used, and the face image is further segmented to obtain the region of interest (ROI). During pore identifying, an ROI of pores includes the two cheeks on two sides of a face and a node region, as shown in FIG. 4A. During blackhead identifying, an ROI of blackheads includes anode region, as shown in FIG. 4B.

S302. Divide the region of interest into a highlighted region and a non-highlighted region.

For example, because light reflection on the face varies in the face image due to uneven light on the face, the region of interest is divided into the highlighted region and the non-highlighted region on this basis.

S303. Separately determine a first segmentation threshold of the highlighted region and a second segmentation threshold of the non-highlighted region.

S304. Obtain a binary-image of the highlighted region based on the first segmentation threshold, and obtain a binary image of the non-highlighted region based on the second segmentation threshold.

S305. Fuse the binary image of the highlighted region and the binary image of the non-highlighted region.

S306. Identify, based on a fused image, pores and/or blackheads included in the region of interest.

According to the skin detection method provided in this embodiment of this application, the region of interest is divided into the highlighted region and the non-highlighted region, the determined segmentation thresholds are allocated for the two regions, and binarization processing is performed on each region by using the segmentation threshold corresponding to the region. In comparison with a solution in which one segmentation threshold is determined for the region of interest, this can avoid impact of light on the segmentation thresholds, thereby improving accuracy in detecting pores and/or blackheads.

In a possible implementation, in step S306, when pores and/or blackheads included in the region of interest are identified based on the fused image, corrosion and/or expansion processing may be first performed on the fused image; and the pores and/or the blackheads included in the region of interest are identified based on the fused image that has undergone the corrosion and/or expansion processing.

It should be noted that the corrosion processing can eliminate boundary points of an object to reduce a target, and can eliminate noise points smaller than a structural element; and the expansion processing can combine all background points in contact with an object into the object, to enlarge a target, thereby filling in holes in the target.

For example, corrosion-before-expansion processing may be performed on the fused image, or expansion-before-corrosion processing may be performed on the fused image. The corrosion-before-expansion processing can eliminate tiny noise on the image and smooth a boundary of an object. The expansion-before-corrosion processing can fill in tiny holes in the object and smooth the boundary of the object.

Figure 5A:
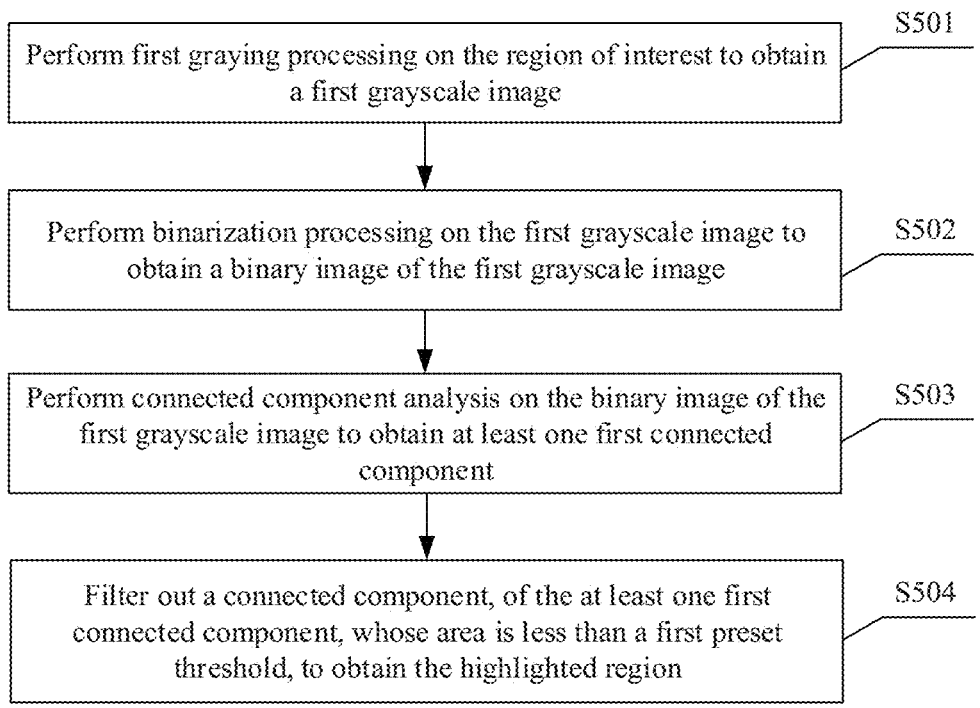
FIG. 5A is a schematic diagram of a method of locating a highlighted region according to an embodiment of this application.

In a possible implementation, step S302 of dividing the region of interest into a highlighted region and a non-highlighted region, that is, locating the highlighted region and the non-highlighted region, may be implemented in the following manner. As shown in FIG. 5A, the manner includes the following steps.

S501. Perform first graying processing on the region of interest to obtain a first grayscale image.

In a feasible example, grayscale transformation may be directly performed on the region of interest, to obtain the first grayscale image.

For example, a grayscale transformation method may be linear transformation, piecewise linear transformation, non-linear transformation, or the like.

In another feasible example, the performing first graying processing on the region of interest may be implemented in the following manner:

A1. Multiply a pixel value of a $k^{th}$ pixel included in the region of interest by a weight value corresponding to the $k^{th}$ pixel.

The weight value corresponding to the $k^{th}$ pixel may be determined based on a corresponding grayscale value of the $k^{th}$ pixel in a second grayscale image of the region of interest, the second grayscale image of the region of interest is obtained by performing grayscale transformation on the region of interest, k takes all positive integers less than L, and L is a quantity of pixels included in the region of interest.

For example, $W_k$ represents the weight value corresponding to the $k^{th}$ pixel, and $W_k = 1 - I\_gray_k/255$, where $I\_gray_k$ represents the grayscale value of the $k^{th}$ pixel in the second grayscale image of the region of interest.

The second grayscale image of the region of interest may be obtained by performing grayscale transformation on the region of interest.

A2. Perform grayscale transformation on an image that is obtained by multiplying each pixel included in the region of interest by a corresponding weight value, to obtain a third grayscale image.

A3. Perform min-max normalization on the third grayscale image that is obtained through the transformation.

A4. Perform grayscale inversion processing on the third grayscale image that is obtained through the min-max normalization, to obtain the first grayscale image.

For example, to display the obtained highlighted region in white on a black backdrop, min-max normalization may be performed on the third grayscale image, to obtain a min-max normalized image of the third grayscale image, the min-max normalized image is subtracted from 255, and then grayscale inversion processing is performed. To subtract the min-max normalized image from 255 is to use a value obtained by subtracting a pixel value of a pixel in the min-max normalized image from 255, as a pixel value of the pixel.

It should be noted that grayscale inversion is to perform a linear or nonlinear negation operation on a grayscale range of an image, to produce an image that is opposite to the input image in terms of grayscale.

After the first graying processing in A1 to A4, the highlighted region is outlined, thereby increasing a degree of distinction between the highlighted region and the highlighted region.

S502. Perform binarization processing on the first grayscale image to obtain a binary image of the first grayscale image.

S503. Perform connected component analysis on the binary image of the first grayscale image to obtain at least one first connected component.

S504. Filter out a connected component, of the at least one first connected component, whose area is less than a first preset threshold, to obtain the highlighted region, where a region other than the highlighted region in the region of interest is the non-highlighted region.

For example, step S502 of performing connected component analysis on the binary image of the first grayscale image to obtain at least one first connected component may be implemented in the following manner:

B1. Perform expansion and/or corrosion processing on the binary image of the first grayscale image.

B2. Obtain at least one first connected component in the binary image that has undergone the expansion and/or corrosion processing.

Figure 5B:
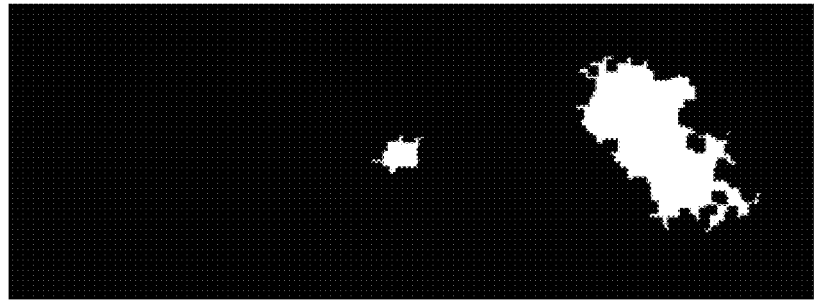
FIG. 5B is a schematic diagram of a highlighted region mask according to an embodiment of this application.

As shown in FIG. 5B, using an ROI of pores as an example, the white regions are located highlighted regions. Specifically, only the nose tip and the right cheek include highlighted regions, and other regions are non-highlighted regions.

Figure 6A:
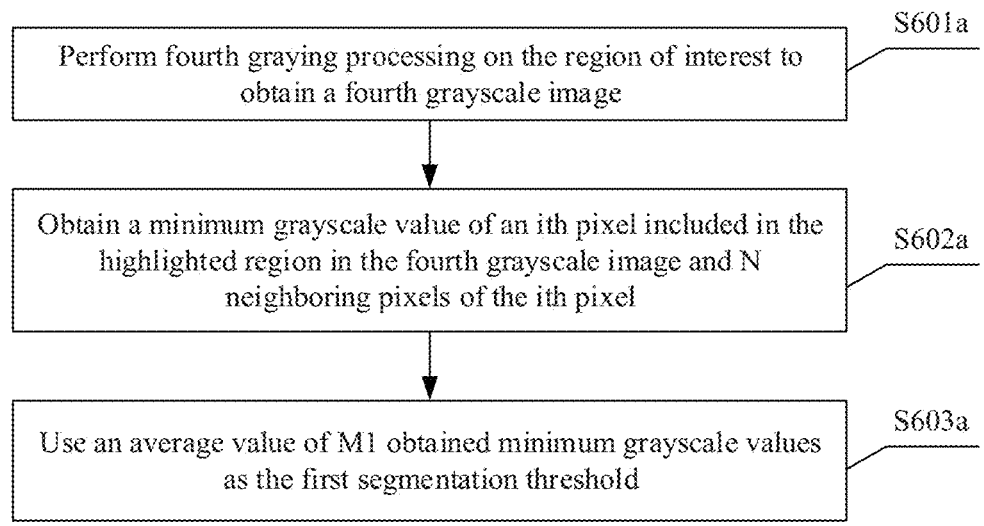
FIG. 6A is a schematic flowchart of a method of determining a segmentation threshold of a highlighted region according to an embodiment of this application.

In a possible implementation, in step S303, the determining a first segmentation threshold of the highlighted region may be implemented in the following manner, as shown in FIG. 6A:

S601a. Perform fourth graying processing on the region of interest to obtain a fourth grayscale image.

S602a. Obtain a minimum grayscale value of an $i^{th}$ pixel included in the highlighted region in the fourth grayscale image and N neighboring pixels of the $i^{th}$ pixel, where i takes all positive integers less than or equal to M1, M1 is a quantity of pixels included in the highlighted region, and N is equal to a multiple of 4, to be specific, four neighbors, eighth neighbors, 16 neighbors, and the like are supported.

Figure 7A:
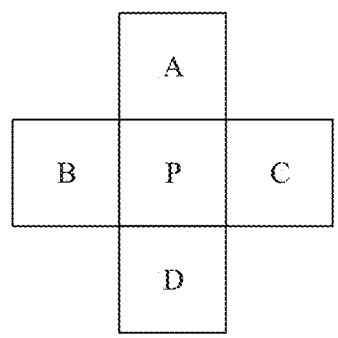
FIG. 7A is a schematic diagram of four neighbors of a pixel according to an embodiment of this application.
Figure 7B:
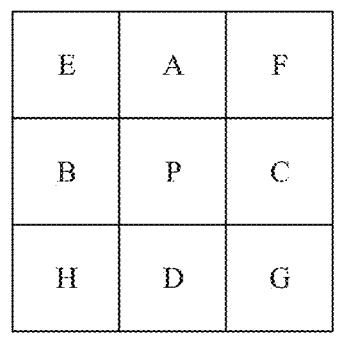
FIG. 7B is a schematic diagram of eight neighbors of a pixel according to an embodiment of this application.

As shown in FIG. 7A, four neighboring pixels of pixel p(x,y) include (x+1,y), (x−1,y), (x−1,y+1), and (x,y+1). As shown in FIG. 7B, eight neighboring pixels of pixel p(x,y) include (x+1,y), (x−1,y), (x,y+1), (x+1,y+1), (x+1,y−1) (x−1,y+1), and (x−1,y−1).

S603a. Use an average value of M1 obtained minimum grayscale values as the first segmentation threshold.

Figure 6B:
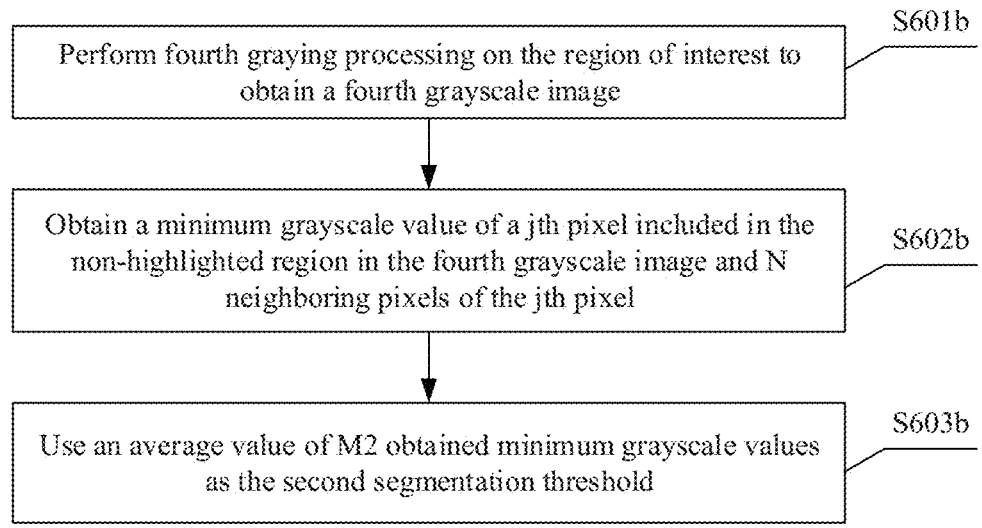
FIG. 6B is a schematic flowchart of a method of determining a segmentation threshold of a non-highlighted region according to an embodiment of this application.

In a possible implementation, in step S303, the determining a first segmentation threshold of the non-highlighted region may be implemented in the following manner, as shown in FIG. 6B:

S601b. Perform fourth graying processing on the region of interest to obtain a fourth grayscale image.

S602b. Obtain a minimum grayscale value of a $j^{th}$ pixel included in the non-highlighted region in the fourth grayscale image and N neighboring pixels of the $j^{th}$ pixel, where j takes all positive integers less than or equal to M2, and M2 is a quantity of pixels included in the non-highlighted region.

S603b. Use an average value of the M2 obtained minimum grayscale values as the second segmentation threshold.

Figure 8A:
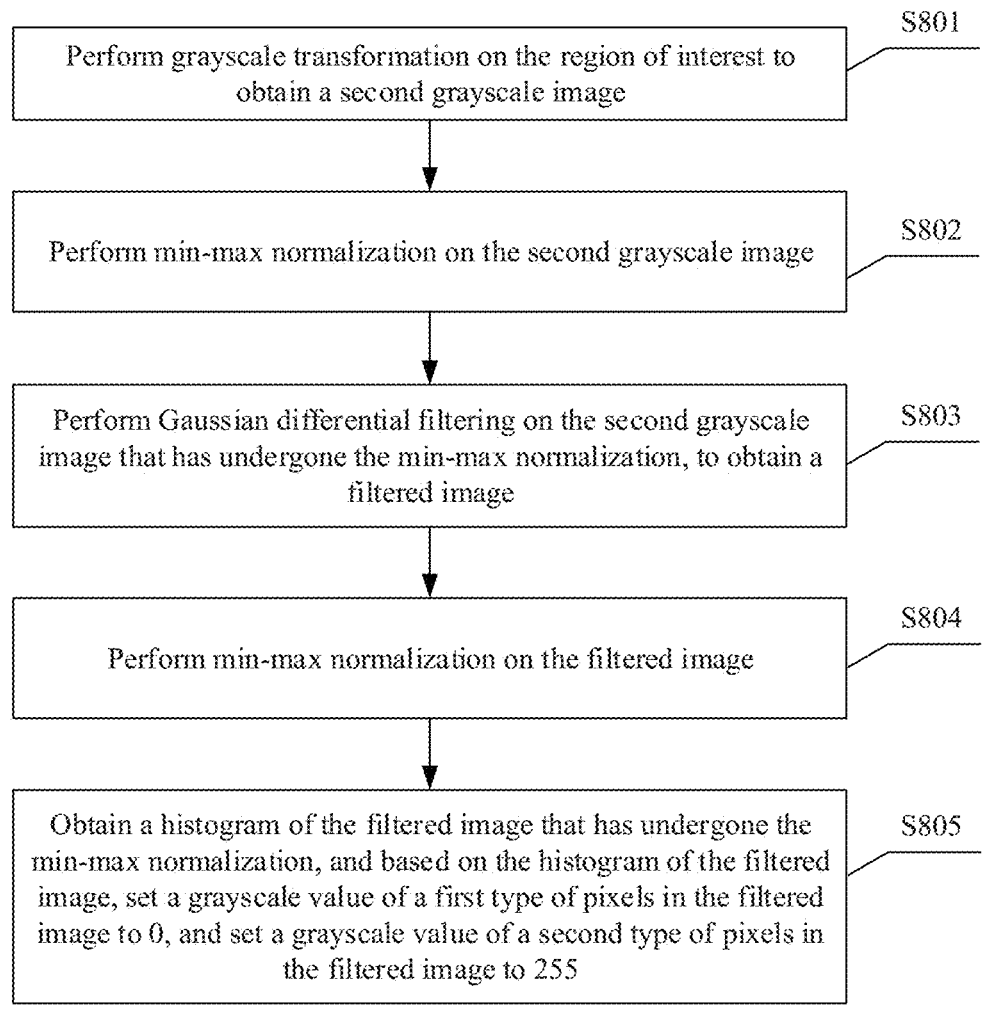
FIG. 8A is a schematic flowchart of fourth graying processing according to an embodiment of this application.

In a possible implementation, the performing fourth graying processing on the region of interest may include the following steps, as shown in FIG. 8A:

S801. Perform grayscale transformation on the region of interest to obtain the second grayscale image.

S802. Perform min-max normalization on the second grayscale image, that is, normalize pixels of the second grayscale image to [0,255].

S803. Perform Gaussian differential filtering on the second grayscale image that has undergone the min-max normalization, to obtain a filtered image. That is, perform Gaussian filtering, of different degrees for two times, on the second grayscale image that has undergone the min-max normalization, and calculate a difference, to obtain a filtered image that is obtained after the Gaussian differential filtering.

Pores or blackheads in the second grayscale image can be enhanced through the Gaussian differential filtering.

S804. Perform min-max normalization on the filtered image.

S805. Obtain a histogram of the filtered image that has undergone the min-max normalization, and based on the histogram of the filtered image, set a grayscale value of a first type of pixels in the filtered image to 0, and set a grayscale value of a second type of pixels in the filtered image to 255.

The grayscale value of the first type of pixels is less than or equal to a minimum grayscale value of other pixels in the filtered image, a percentage of a quantity of the first type of pixels in a total quantity of pixels in the filtered image is a %, a grayscale value of the second type of pixels is greater than or equal to a maximum grayscale value of other pixels in the filtered image, a percentage of a quantity of the second type of pixels in the total quantity of pixels in the filtered image is b %, and a and b are both positive integers. The other pixels are pixels included in the filtered image other than the first type of pixels and the second type of pixels.

Figure 8B:
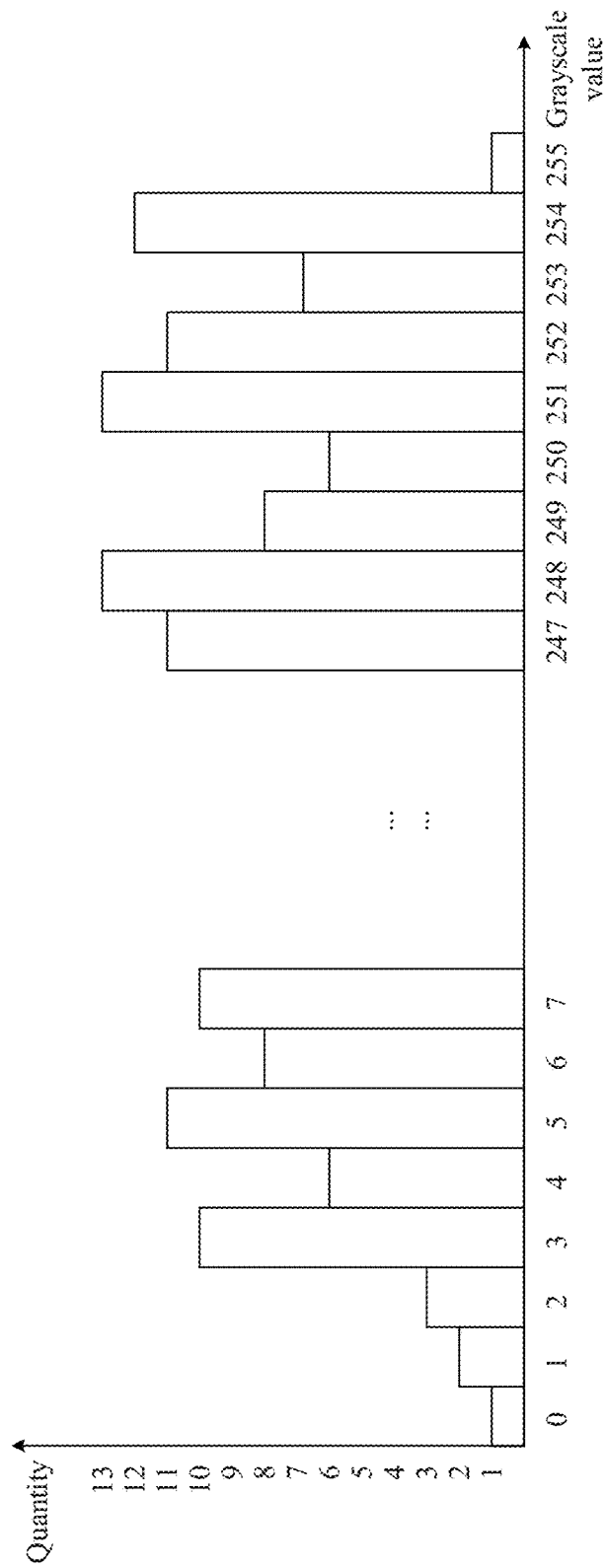
FIG. 8B is a schematic diagram of a histogram according to an embodiment of this application.

A first type of pixels and a second type of pixels in an image are described by using the histogram shown in FIG. 8B as an example. For example, a total quantity of pixels in the image is 1000, and both a and b are 2. The first type of pixels includes one pixel whose grayscale value is 0, two pixels whose grayscale values are 1, three pixels whose grayscale values are 2, 10 pixels whose grayscale values are 3, and four pixels whose grayscale values are 4. There are six pixels whose grayscale values are 4. Therefore, any four pixels may be selected from the six pixels as the first type of pixels. A minimum grayscale value of other pixels is 4, and the grayscale values of the first type of pixels are all less than or equal to 4. The second type of pixels includes one pixel whose grayscale value is 255, 12 pixels whose grayscale values are 254, and seven pixels whose grayscale values are 253. A maximum grayscale value of other pixels is 252, and the grayscale values of the second type of pixels are all greater than 252.

The inventor discovered, when conducting research concerning this application, that false detection of pores or blackheads in a nose shadow region occurs frequently. To reduce a false detection rate, the nose shadow region may be located, and the nose shadow region may be removed from the region of interest before blackheads and pores are determined. In view of this, when pores and/or blackheads included in the region of interest are identified based on the fused image, the nose shadow region may be removed from the fused image, and the pores and/or the blackheads included in the region of interest are determined based on the fused image from which the nose shadow region is removed.

Figure 9:
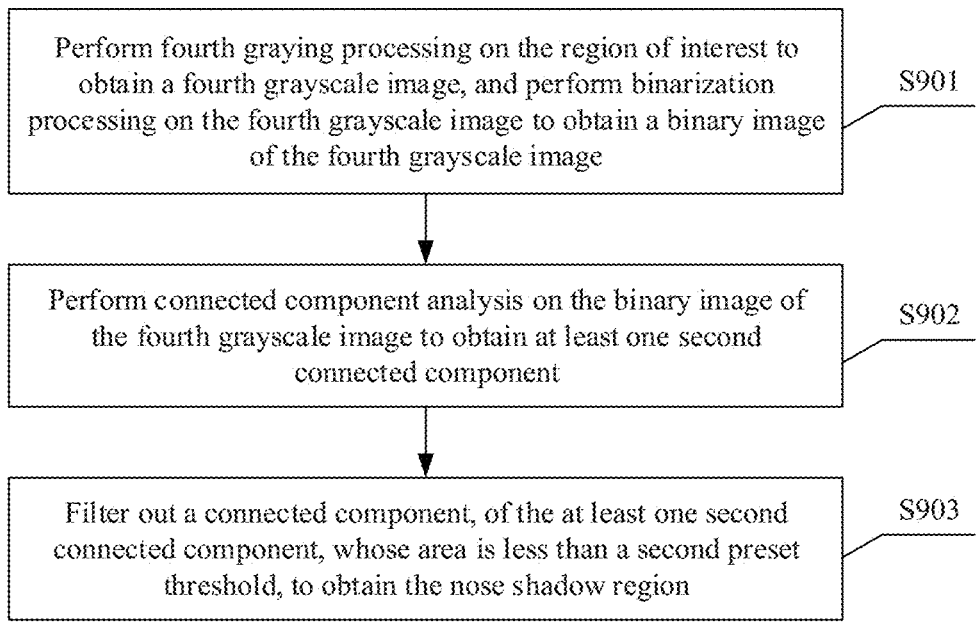
FIG. 9 is a schematic flowchart of a method of determining a nose shadow region according to an embodiment of this application.

In a feasible example, the nose shadow region may be located in the following manner, as shown in FIG. 9:

S901. Perform fourth graying processing on the region of interest to obtain a fourth grayscale image, and perform binarization processing on the fourth grayscale image to obtain a binary image of the fourth grayscale image. For a process of performing fourth graying processing on the region of interest, refer to the foregoing descriptions of FIG. 8A. Details are not described herein again.

S902. Perform connected component analysis on the binary image of the fourth grayscale image to obtain at least one second connected component.

Optionally, step S902 of performing connected component analysis on the binary image of the fourth grayscale image to obtain at least one second connected component may include: performing expansion and/or corrosion processing on the binary image of the fourth grayscale image; and obtaining at least one second connected component in the binary image, of the fourth grayscale image, that has undergone the expansion and/or corrosion processing. For example, expansion-before-corrosion processing or corrosion-before-expansion may be performed on the binary image of the fourth grayscale image.

S903. Filter out a connected component, of the at least one second connected component, whose area is less than a second preset threshold, to obtain the nose shadow region.

In a possible implementation, S304 of obtaining a binary image of the highlighted region based on the first segmentation threshold, and obtaining a binary image of the non-highlighted region based on the second segmentation threshold may be implemented in the following manner:

performing fourth graying processing on the region of interest to obtain a fourth grayscale image; performing binarization processing on a corresponding highlighted region in the fourth grayscale image based on the first segmentation threshold, to obtain a binary image of the highlighted region; and performing binarization processing on a corresponding non-highlighted region in the fourth grayscale image based on the second segmentation threshold, to obtain a binary image of the non-highlighted region.

It should be noted that, during the determining of the segmentation threshold of the highlighted region and the segmentation threshold of the non-highlighted region, the locating of the nose shadow region, and the obtaining of the binary image of the highlighted region and the binary image of the non-highlighted region, fourth graying processing may be performed on the region of interest, to obtain a fourth grayscale image. This operation may be performed only once in this embodiment of this application, and the fourth grayscale image is buffered and is fetched from the buffer when needed.

In a possible implementation, step S306 of identifying, based on a fused image, pores and/or blackheads included in the region of interest may be implemented in the following manner:

D1. Obtain at least one third connected component included in the fused image, and obtain a parameter corresponding to each third connected component, where the parameter includes at least one of the following: a radius, a degree of circularity, and an internal-external color variation value, and the degree of circularity is used to represent a degree of similarity between a shape of the third connected component and a circle.

It should be noted that during the operation of removing the nose shadow region, the identifying, based on a fused image, pores and/or blackheads included in the region of interest includes: obtaining at least one third connected component included in the fused image from which the nose shadow region is removed.

Connected component analysis is performed on the fused image; and a radius, a degree of circularity, or an internal-external color variation value of each third connected component is calculated and record.

For example, $O_i$ represents a degree of circularity of an $i^{th}$ third connected component, and $O_i=4\pi*$ Area/Perimeter$^2$. A shape of the third connected component is more likely a circle as $O_i$ gets closer to 1. In the formula, the area is an area of the third connected component, and the perimeter is a perimeter of the third connected component.

For example, an internal-external color variation value of the $i^{th}$ third connected component is represented by $V_i$.

Figure 10:
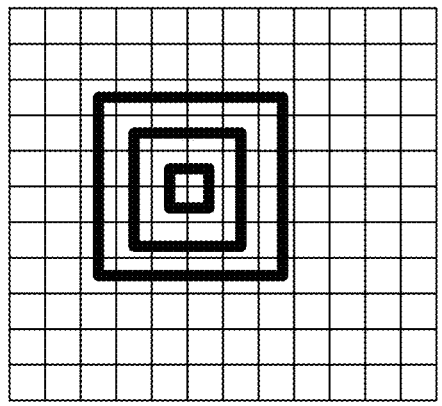
FIG. 10 is a schematic diagram of an internal and an external of a connected component according to an embodiment of this application.

The internal-external color variation value of the third connected component may be determined in the following manner, without being limited to the following manner:

In a first possible implementation:

For the $i^{th}$ third connected component, minimum values (or average values), of all corresponding pixels of the third connected component in an original ROI image, respectively in three channels R, G, and B are calculated first and denoted as In_R, In_G, and In_B. Then the $i^{th}$ third connected component is expanded outwardly by one circle (or N circles), and average values of pixels in the one circle (or the N circles) respectively in the three channels R, G, and B are calculated and denoted as Out_R, Out_G, and Out_B. Using the illustration in FIG. 10 as an example, the innermost rectangle represents a connected component. If the connected component is expanded by one circle, average values, of pixels covered by a rectangle in the middle, respectively in the channels R, G, and B may be calculated. If the connected component is expanded by two circles, average values, of pixels covered by a rectangle in the outermost circle, respectively in the channels R, G, and B may be calculated. Finally, for the $i^{th}$ third connected component, a value of(Out_R−In_R)+(Out_G−In_G)+(Out_B−In_B) is calculated and used as the internal-external color variation value of the connected component, that is, $V_i$=(Out$_R$−In$_R$)+(Out$_G$−In$_G$)+(Out_B−In_B).

In a second possible implementation:

A sum of internal-to-external color ratios of the third connected component in three channels is used as the internal-external color variation value of the third connected component; $V_i$=(In_R/Out_R)+(In_G/Out_G)+(In_B/Out_B).

In a third possible implementation:

A minimum value (or an average value) of grayscale values of all pixels, corresponding to each third connected component, in a grayscale image of the ROI (which may be the second grayscale image or the fourth grayscale image corresponding to the ROI) is calculated and denoted as In_Gray. Then each third connected component is expanded outwardly by one circle (or N circles), and an average value of grayscale values of pixels in the one circle (or the N circles) is calculated and denoted as Out_Gray. (Out_Gray−In_Gray) is calculated and used as the internal-external color variation value of the third connected component, that is, $V_i$=(Out_Gray−In_Gray).

In a fourth possible implementation:

An internal-to-external color ratio of a grayscale image of the ROI is calculated; In_Gray/Out_Gray, which is used as the internal-external color variation value of the third connected component, that is, $V_i$=In_Gray/Out_Gray.

D2. Identify, based on the parameter corresponding to each third connected component, whether a location corresponding to the third connected component is a pore or a blackhead.

Determination of an effective pore/blackhead; Based on the foregoing connected component analysis and calculation of various indicators; a pore is detected and a third connected component that meets a condition 1 is determined as a pore; and a blackhead is detected, and a third connected component that meets a condition 2 is determined as a blackhead. For example, the condition 1 may be as follows: A radius is within a range of [A1,B1], an internal-external color variation value is greater than C1, and a degree of circularity is greater than D1; and the condition 2 may be as follows: A radius is within a range of [A2,B2], an internal-external color variation value is greater than C2, and a degree of circularity is greater than D2.

After pores or blackheads included in the ROI are identified, a quantized score of the pores or blackheads may be calculated.

For example, the quantized score of the pores may be determined in the following manner:

processing an image corresponding to the identified pores to obtain a quantized pore indicator; calculating a quantized pore score of the region of interest based on the quantized pore indicator; and displaying the quantized pore score.

The quantized pore indicator includes at least one of the following: a pore area ratio, a pore density, an average pore internal-external color variation value, and a ratio of a pore internal-external color variation value-weighted area; and the pore area ratio is a ratio of a total area of pores included in the region of interest to an area of the ROI. That is, $$Z_1^1 = \sum_j^{n1} P_j^1 / PO1.$$

In the formula, $Z_1^1$ represents the pore area ratio, $P_j^1$ represents an area of a $j^{th}$ pore, PO1 represents the area of the ROI, and n I represents a quantity of pores.

The pore density is a ratio of the quantity of pores included in the region of interest to the area of the region of interest. That is, $Z_2^1$=n1/PO1, where $Z_2^1$ represents the pore density.

The average pore internal-external color variation value is an average value of internal-external color variation values of the pores included in the region of interest. That is, $$Z_3^1 = \sum_j^n H_j^1 / n1,$$

where $Z_3^1$ represents the average pore internal-external color variation value, and $H_j^1$ represents an internal-external color variation value of the $j^{th}$ pore.

For a manner for determining an internal-external color variation value of a pore, refer to the descriptions of the manners for calculating an internal-external color variation value of a connected component.

The ratio of the pore internal-external color variation value-weighted area is a ratio, to the area of the region of interest, of a sum that is obtained by adding all values obtained by multiplying, by a corresponding area, an internal-external color variation value of each pore included in the region of interest. That is, $$Z_4^1 = \sum_j^n H_j^1 * P_j^1 / PO1,$$

where $Z_4^1$ represents the ratio of the pore internal-external color variation value-weighted area.

For example, pore score=$w1*Z_1^1+w2*Z_2^1+w3*Z_{31}^1+w4*Z_4^1+w5$, where w1 to w5 are weight values.

For example, the quantized score of the blackheads may be determined in the following manner:

processing an image corresponding to the identified blackheads to obtain a quantized blackhead indicator; and calculating a quantized blackhead score of the region of interest based on the quantized blackhead indicator.

The quantized blackhead indicator includes at least one of the following a blackhead area ratio, a blackhead density, an average blackhead internal-external color variation value, and a ratio of a blackhead internal-external color variation value-weighted area.

The blackhead area ratio is a ratio of a total area of blackheads included in the region of interest to the area of the ROI. That is, $$Z_1^2 = \sum_k^{n2} P_k^2 / PO2,$$

where $Z_1^2$ represents the blackhead area ratio, $P_k^2$ represents an area of a $k^{th}$ blackhead, PO1 represents the area of the ROI, and n2 represents a quantity of blackheads.

The blackhead density is a ratio of the quantity of blackheads included in the region of interest to the area of the region of interest. That is, $Z_2^2$=n2/PO2, where $Z_2^2$ represents the blackhead density.

The average blackhead internal-external color variation value is an average value of internal-external color variation values of the blackhead included in the region of interest. That is, $$Z_3^2 = \sum_k^{n2} H_k^2 / n2,$$

where $Z_3^2$ represents the average blackhead internal-external color variation value, and $H_k^2$ represents an internal-external color variation value of the $k^{th}$ blackhead.

For a manner for determining an internal-external color variation value of a blackhead, refer to the descriptions of the manners for calculating an internal-external color variation value of a connected component.

The ratio of the blackhead internal-external color variation value-weighted area is a ratio, to the area of the region of interest, of a sum that is obtained by adding all values obtained by multiplying, by a corresponding area, an internal-external color variation value of each blackhead included in the region of interest. That is, $$Z_4^1 = \sum_j^{n2} H_k^2 * P_k^2 / PO2,$$

where $Z_4^2$ represents the ratio of the blackhead internal-external color variation value-weighted area.

For example, blackhead score=$y1*Z_1^2+y2*Z_2^2+y3*Z_3^2+y4*Z_4^2+y5$, where y1 to y5 are weight values.

Figure 11:
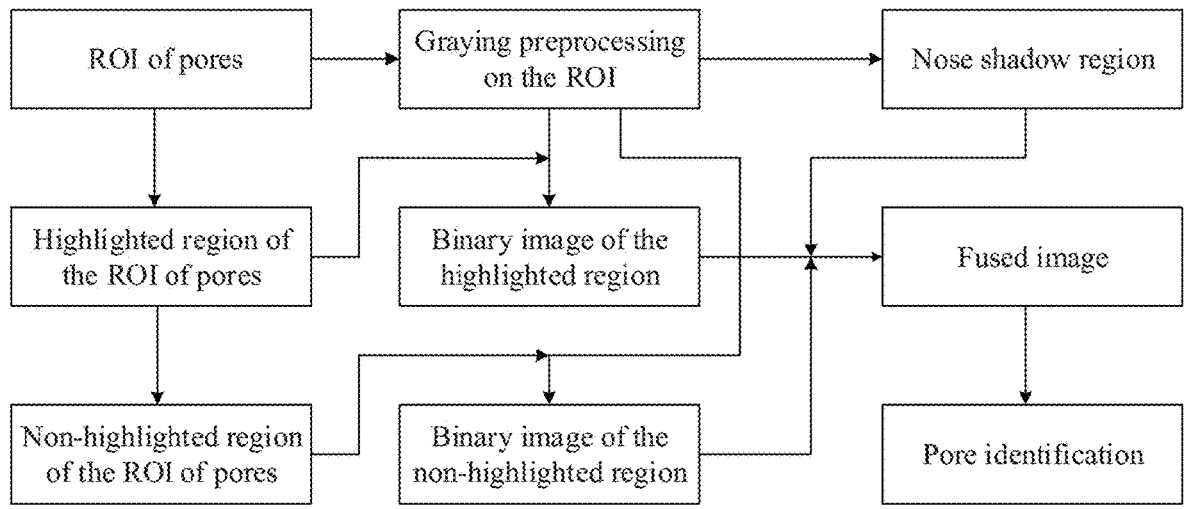
FIG. 11 is a schematic flowchart of skin detection according to an embodiment of this application.

The following describes a skin detection process by using pore detection as an example, as shown in FIG. 11.

Figure 12A:
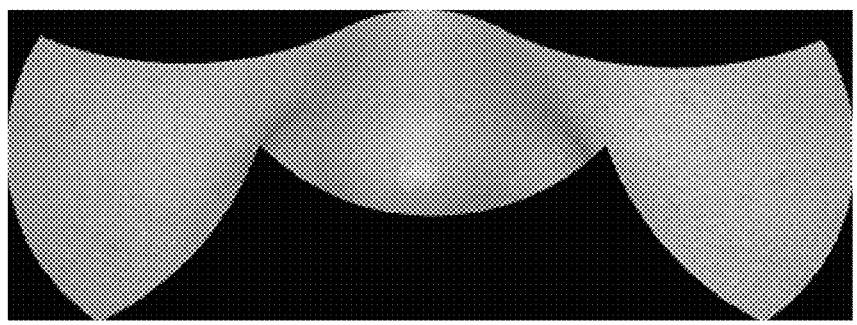
FIG. 12A is a schematic diagram of an ROI of pores according to an embodiment of this application.
Figure 12B:
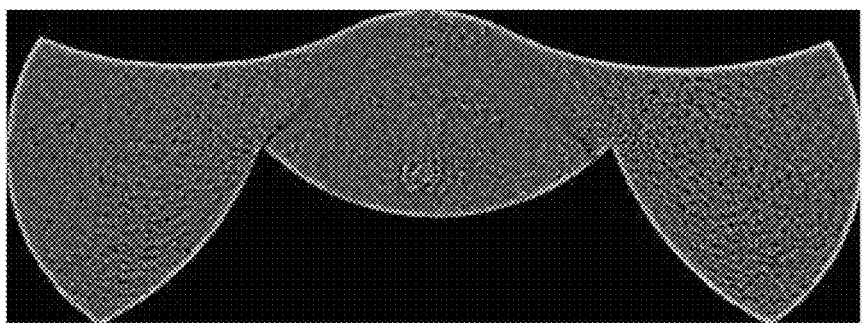
FIG. 12B is a schematic diagram of a fourth grayscale image of an ROI of pores according to an embodiment of this application.
Figure 12C:
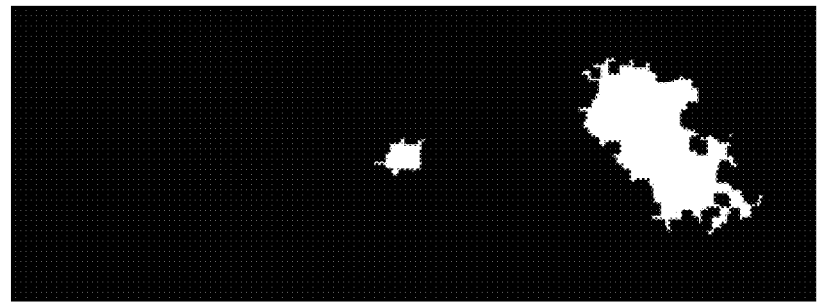
FIG. 12C is a schematic diagram of a highlighted region according to an embodiment of this application.
Figure 12D:
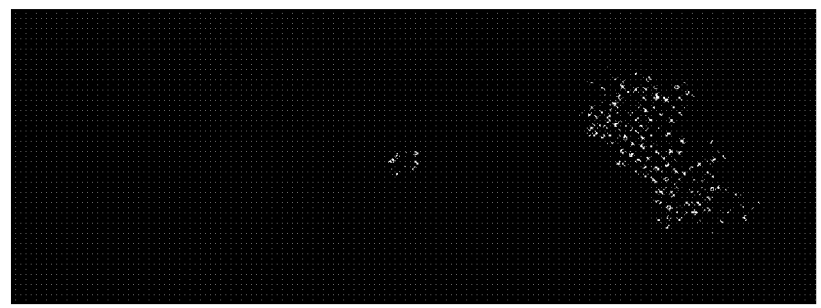
FIG. 12D is a schematic diagram of a binary image of a highlighted region according to an embodiment of this application.
Figure 12E:
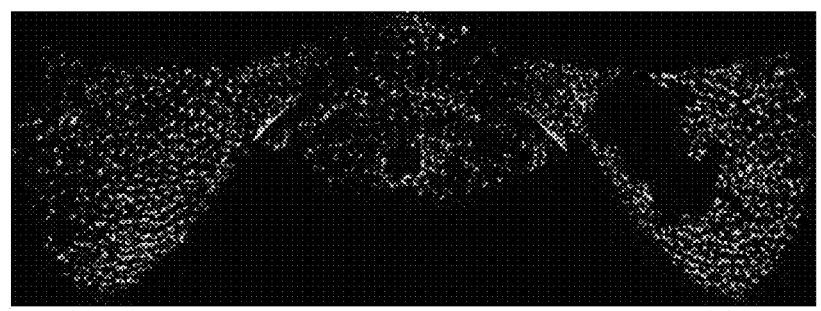
FIG. 12E is a schematic diagram of a binary image of a non-highlighted region according to an embodiment of this application.
Figure 12F:
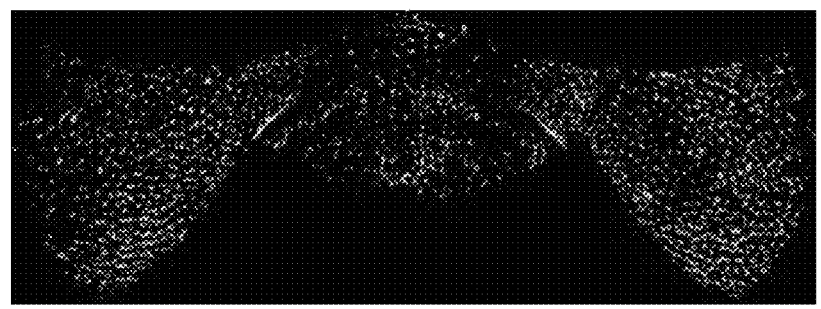
FIG. 12F is a schematic diagram of a binary image of a fused image according to an embodiment of this application.
Figure 12G:
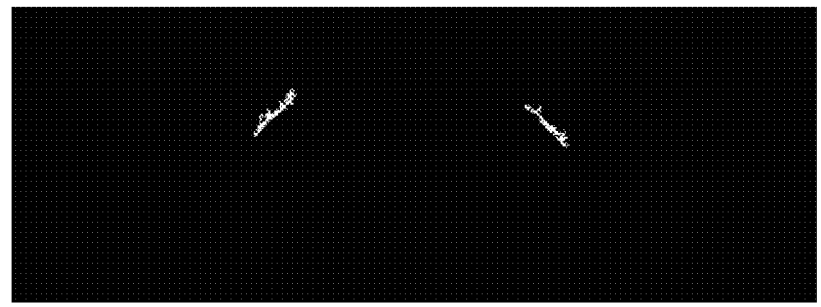
FIG. 12G is a schematic diagram of a nose shadow region according to an embodiment of this application.

Obtain an image; Obtain an ROI of pores, for example, as shown in FIG. 12A. Perform graying preprocessing on the ROI; perform fourth graying processing on the ROI of pores to obtain a fourth grayscale image of the ROI of pores, as shown in FIG. 12B. This may be implemented by using the process shown in FIG. 8A. Locate a highlighted region of the ROI of pores, that is, obtain a highlighted region mask, such as a highlighted region shown in FIG. 12C. This may be implemented by using the process shown in FIG. 5A. Locate a non-highlighted region of the ROI of pores. Based on the fourth grayscale image corresponding to the ROI of pores, determine a first segmentation threshold of the highlighted region, and determine a second segmentation threshold of the non-highlighted region. This may be implemented by using the processes shown in FIG. 6A and FIG. 6B. Perform, based on the first segmentation threshold, binarization processing on the fourth grayscale image corresponding to the ROI of pores, to obtain a binary image of the highlighted region, as shown in FIG. 12D. Perform, based on the second segmentation threshold, binarization processing on the fourth grayscale image of the ROI of pores, to obtain a binary image of the non-highlighted region, as shown in FIG. 12E. Fuse the binary image of the highlighted region and the binary image of the non-highlighted region, to obtain a fused image, as shown in FIG. 12F. Locate a nose shadow region based on the fourth grayscale image corresponding to the ROI of pores, to obtain a nose shadow region mask, as shown in FIG. 12G. Obtain the fused image from which the nose shadow region is removed, and determine a quantized score of pores based on pores included in an ROI in the fused image from which the nose shadow region is removed.

Figure 13A:
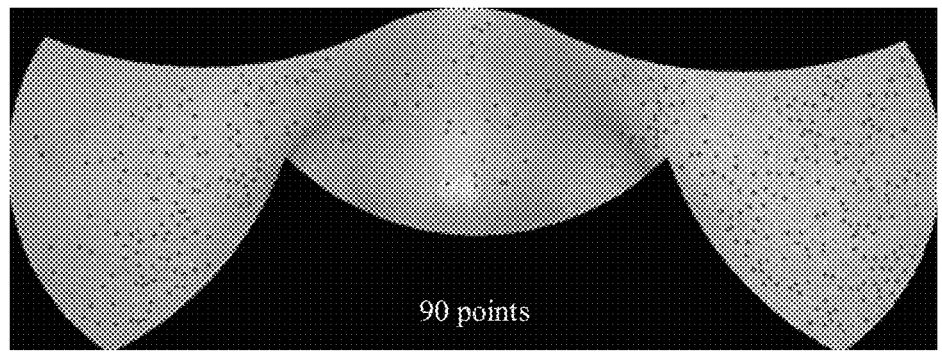
FIG. 13A to FIG. 13C are schematic diagrams of pore detection results according to an embodiment of this application.
Figure 13B:
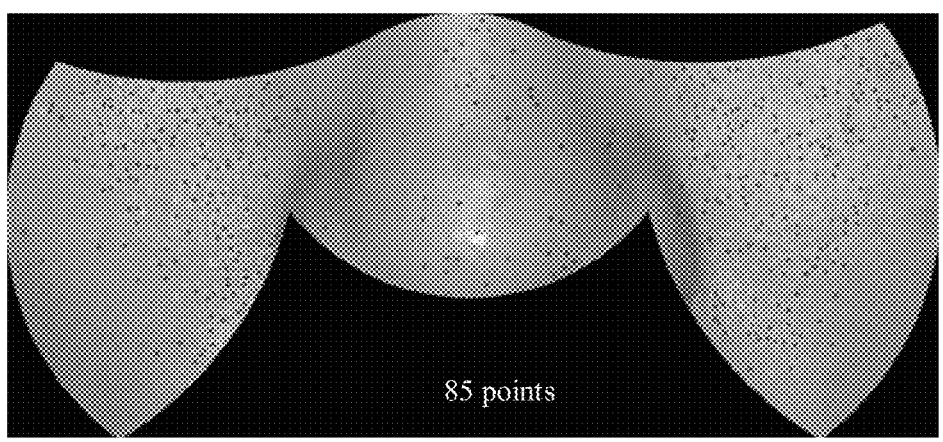
Figure 13C:
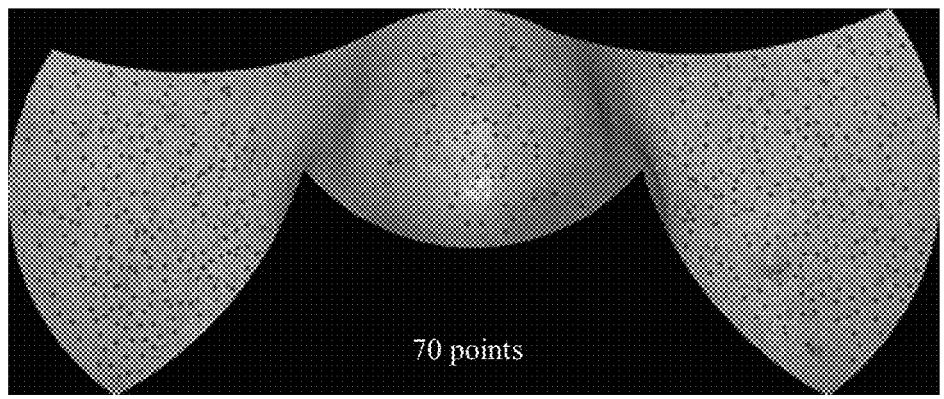
Figure 14:
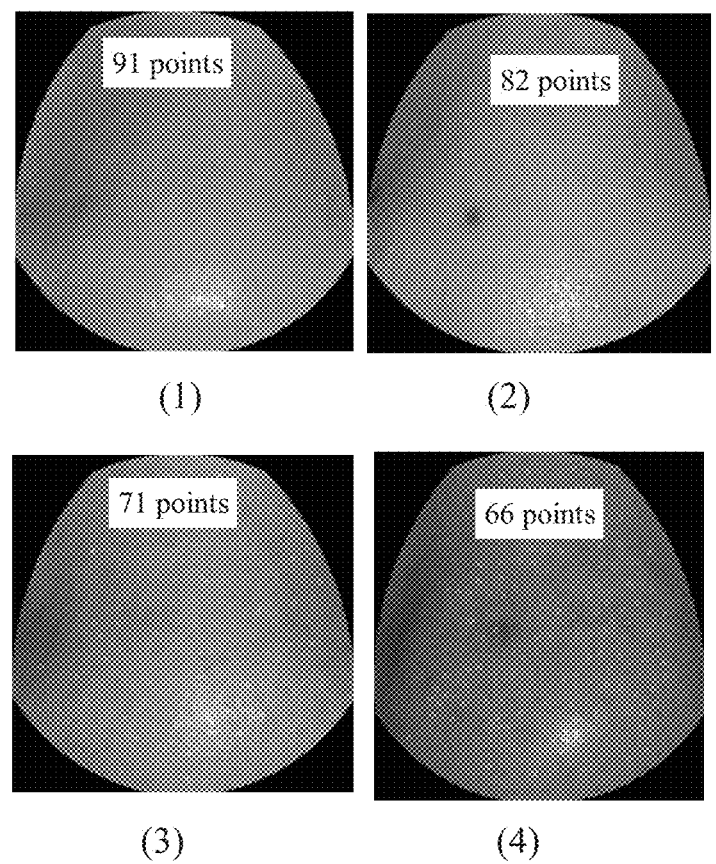
FIG. 14 is a schematic diagram of blackhead detection results according to an embodiment of this application.

FIG. 13A, FIG. 13B, and FIG. 13C show three examples of pore detection results. FIG. 14 shows four examples of blackhead detection results.

Figure 2:
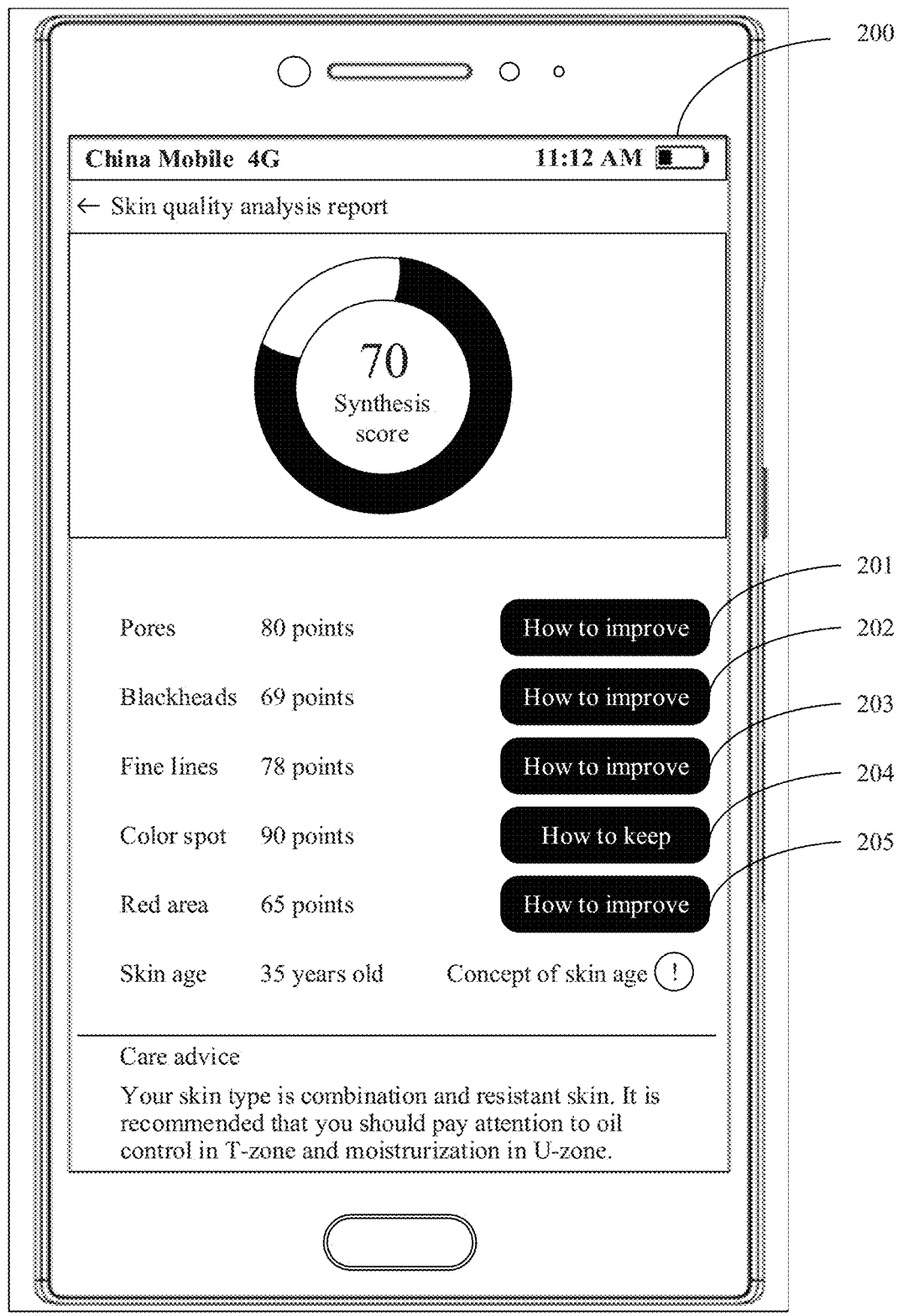
FIG. 2 is a schematic diagram of a user interface according to an embodiment of this application.

In a possible implementation, for example, the processor 110 performs the skin detection method according to this application. After identifying pores and/or blackheads and determining a quantized pore score and a quantized blackhead score, the processor 110 may display the quantized pore score and the quantized blackhead score on the user interface presented on the display screen 194. For example, as shown in FIG. 2, the quantized blackhead score and the quantized pore score are displayed on the user interface presented on the display screen 194.

Figure 15:
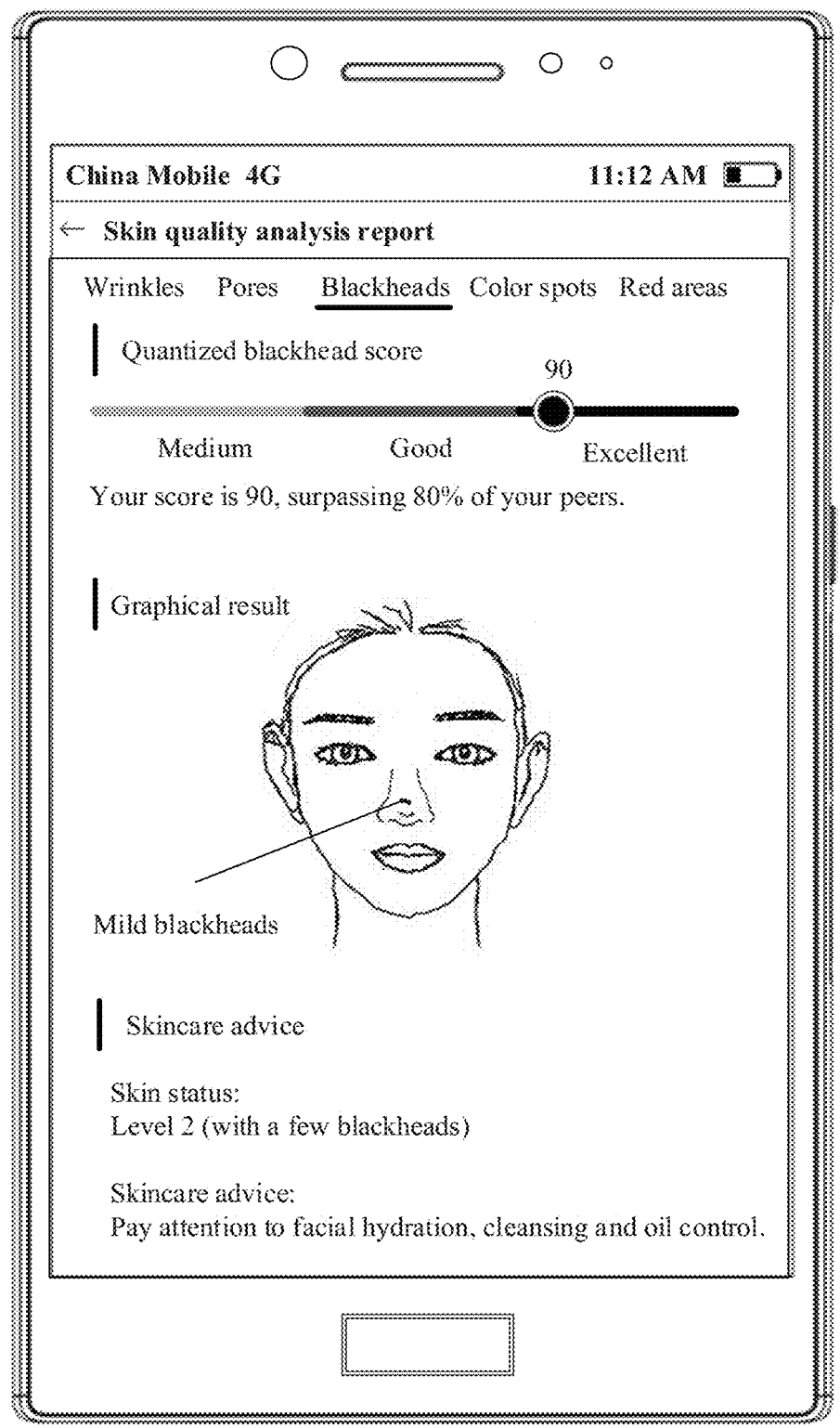
FIG. 15 is a schematic diagram of a skin quality analysis report according to an embodiment of this application.

After pores and/or blackheads are detected by using the skin detection method provided in this embodiment of this application, a detection result report may further be provided to a user. The detection result report may include but is not limited to the quantized pore score, the quantized blackhead score, skincare advice, a graphical result, and the like. A face image of the user may be displayed on the user interface presented on the display screen 194, and blackheads and pores are marked on the face image in different display manners. The detection result report may be a report presented on a user interface 1500 shown in FIG. 15. Presentation of the user interface 1500 may be triggered when the electronic device 100 detects that the user taps the virtual button 201 or 202 shown in FIG. 2, or may be triggered when the electronic device 100 detects that the user taps on a display region in which the quantized blackhead score or the quantized pore score is located on the user interface. Using the user interface 200 shown in FIG. 2 as an example, displaying of the user interface 1500 is triggered when the electronic device 100 detects that the user taps on a display region in which an entry "Blackheads 69 points" is located on the display screen 194. Certainly, presentation of the user interface 1500 may alternatively be triggered in another manner. A manner for triggering presentation of the user interface 1200 is not specifically limited in this embodiment of this application.

The foregoing embodiments may be used in combination, or may be used independently.

In the foregoing embodiment provided in this application, the method provided in this embodiment of this application is described from a perspective in which the electronic device is an execution body. To implement the functions in the method provided in this embodiment of this application, the electronic device may include a hardware structure and/or a software module, and implement the foregoing functions in a form of a hardware structure, a software module, or a combination of a hardware structure and a software module. Whether a specific function of the foregoing functions is implemented in a manner of a hardware structure, a software module, or a combination of a hardware structure and a software module depends on particular applications and design constraint conditions of the technical solutions.

Figure 16:
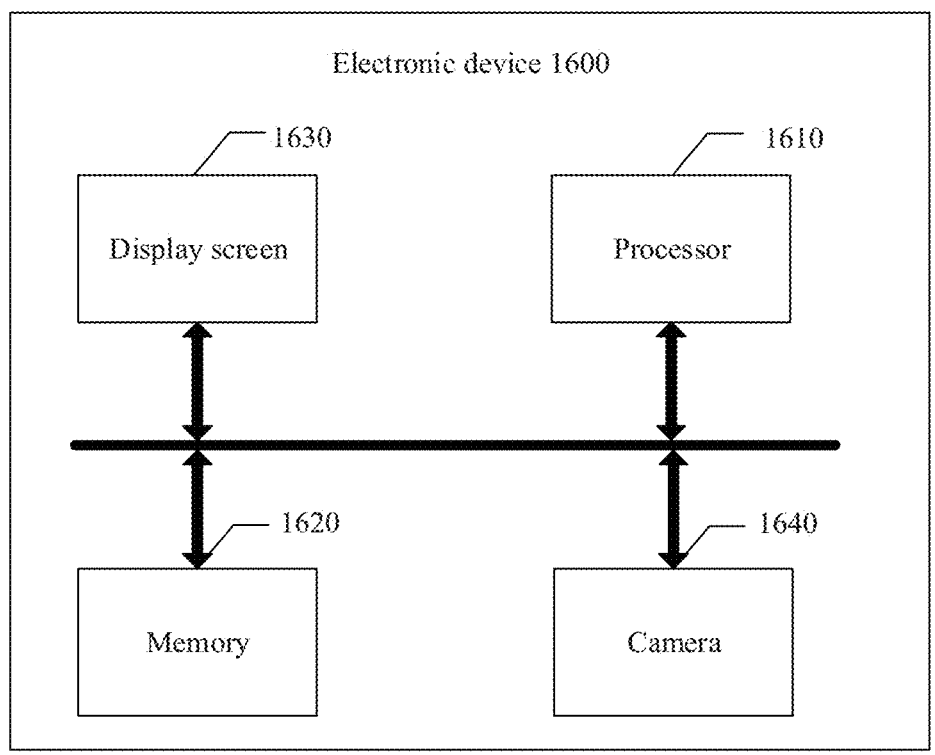
FIG. 16 is a schematic diagram of an electronic device 1600 according to an embodiment of this application.

Based on the same concept. FIG. 16 shows an electronic device 1600 according to this application. For example, the electronic device 1600 includes at least one processor 1610 and a memory 1620, and may further include a display screen 1630 and a camera 1640. The processor 1610 is coupled to the memory 1620, and the display screen 1630 is coupled to the camera 1640. In this embodiment of this application, coupling is indirect coupling or communicative connection between apparatuses, units, or modules. The coupling may be in electrical, mechanical, or other forms, and is used to exchange information between the apparatuses, units, or modules.

Specifically, the memory 1620 is configured to store a program instruction, the camera 1640 is configured to capture an image, and the display screen 1630 is configured to display a photographing preview interface when the camera 1640 is started for photographing, where the photographing preview interface includes an image collected by the camera 1640. The display screen 1630 may further be configured to display a user interface mentioned in the foregoing embodiment, for example, the user interface shown in FIG. 2, the interface shown in FIG. 4A, the user interface shown in FIG. 10, the user interface shown in FIG. 11, and the user interface shown in FIG. 12. The processor 1610 is configured to invoke and execute the program instruction stored in the memory 1620, to perform the steps in the skin detection method shown in FIG. 3A.

It should be understood that the electronic device 1600 may be configured to implement the skin detection method shown in FIG. 3A according to the embodiments of this application. For related features, refer to the foregoing descriptions. Details are not described herein again.

A person skilled in the art may clearly understand that the embodiments of this application may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. By way of example and not limitation, the computer readable medium may include a RAM, a ROM, an electrically erasable programmable read only memory (electrically erasable programmable read only memory, EEPROM), a compact disc read-only memory (compact disc read-only memory. CD-ROM) or another compact disc memory, a magnetic disk storage medium or another magnetic storage device, or any other medium that can be used to carry or store expected program code having an instruction or data structure form and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (digital subscriber line, DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (disk) and disc (disc) used by the embodiments of this application includes a compact disc (compact disc, CD), a laser disc, an optical disc, a digital video disc (digital video disc, DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely embodiments of this application, but is not intended to limit the protection scope of this application. Any modification, equivalent substitution, and improvements based on the disclosure of this application shall fall within the protection scope of this application.

What is claimed is:
1. A skin detection method comprising:
    obtaining a region of interest in a face image;
    dividing the region of interest into a highlighted region and a non-highlighted region;
    determining a first segmentation threshold of the highlighted region;
    determining a second segmentation threshold of the non-highlighted region;
    obtaining a first binary image of the highlighted region based on the first segmentation threshold;
    obtaining a second binary image of the non-highlighted region based on the second segmentation threshold;
    fusing the first binary image and the second binary image to obtain a fused image; and
    identifying, based on the fused image, pores, blackheads, or both pores and blackheads in the region of interest.
2. The skin detection method of claim 1, further comprising:
    performing first graying processing on the region of interest to obtain a first grayscale image;

performing binarization processing on the first grayscale image to obtain a third binary image;
performing connected component analysis on the third binary image to obtain at least one first-connected component; and
filtering out a first connected component, of the at least one connected component, that comprises an area less than a first preset threshold to obtain the highlighted region, wherein a region other than the highlighted region in the region of interest is the non-highlighted region.

3. The skin detection method of claim 2, further comprising:
performing grayscale transformation on the region of interest to obtain a second grayscale image;
multiplying each pixel of a plurality of pixels in the region of interest by a respective weight value, of a plurality of weight values, corresponding to the pixel to obtain a multiplied image, wherein each weight value of the plurality of weight values based on a grayscale value of a respective pixel in the second grayscale image;
performing grayscale transformation on the multiplied image to obtain a third grayscale image;
performing min-max normalization on the third grayscale image to obtain a min-max normalized third grayscale image; and
performing grayscale inversion processing on the min-max normalized third grayscale image to obtain the first grayscale image.

4. The skin detection method of claim 2, further comprising:
performing expansion processing, corrosion processing, or both expansion processing and corrosion processing on the third binary image to obtain a processed image; and
obtaining at least one second connected component in the processed image.

5. The skin detection method of claim 1, further comprising:
performing first graying processing on the region of interest to obtain a first grayscale image;
obtaining a plurality of minimum grayscale values of pixels in the highlighted region in the first grayscale image and a plurality of neighboring pixels of each of the pixels, wherein a quantity of neighboring pixels is equal to a multiple of 4; and
using an average value of the minimum grayscale values as the first segmentation threshold.

6. The skin detection method of claim 1, further comprising:
performing graying processing on the region of interest to obtain a grayscale image;
obtaining a plurality of minimum grayscale values of pixels in the non-highlighted region in the grayscale image and a plurality of neighboring pixels of each of the pixels; and
using an average value of the minimum grayscale values as the second segmentation threshold.

7. The skin detection method of claim 1, further comprising:
performing corrosion processing, expansion processing, or both corrosion processing and expansion processing on the fused image to obtain a processed image; and
identifying, based on the processed image the pores, the blackheads, or both the pores and the blackheads in the region of interest.

8. The skin detection method of claim 1, further comprising:
removing a nose shadow region from the fused image to obtain a fourth image; and
determining, based on the fourth image, the pores, the blackheads, or both the pores and the blackheads, in the region of interest.

9. The skin detection method of claim 8, further comprising:
performing graying processing on the region of interest to obtain a grayscale image;
performing binarization processing on the grayscale image to obtain a third binary image;
performing connected component analysis on the third binary image to obtain at least one first connected component; and
filtering out a connected component, of the at least one first connected component, comprising an area less than a second preset threshold to obtain the nose shadow region.

10. The skin detection method of claim 9, further comprising:
performing expansion processing, corrosion processing, or both expansion processing and corrosion processing on the third binary image to obtain a processed binary image; and
obtaining at least one second connected component in the processed binary image.

11. The skin detection method of claim 5, further comprising:
performing grayscale transformation on the region of interest to obtain a second grayscale image;
performing min-max normalization on the second grayscale image to obtain a min-max normalized second grayscale image;
performing Gaussian differential filtering on the min-max normalized second grayscale image to obtain a filtered image;
performing min-max normalization on the filtered image to obtain a min-max normalized filtered image;
obtaining a histogram of the min-max normalized filtered image; and
based on the histogram, setting a first grayscale value of a first type of pixels in the filtered image to 0 and setting a second grayscale value of a second type of pixels in the filtered image to 255, wherein the first grayscale value is less than or equal to a minimum grayscale value of other pixels in the filtered image, wherein a first percentage of a first quantity of the first type of pixels in a total quantity of pixels in the filtered image is a %, wherein the second grayscale value is greater than or equal to a maximum grayscale value of other pixels in the filtered image, wherein a second percentage of a second quantity of the second type of pixels in the total quantity is b %, and wherein a and b are both positive integers.

12. The skin detection method of claim 1, further comprising:
obtaining at least one connected component comprised in the fused image;
obtaining a parameter for each connected component of the at least one connected component, wherein the parameter comprises at least one of a radius, a degree of circularity, or an internal-external color variation value; and
identifying, for each connected component of the at least one connected component based on the parameter for the connected component, whether a first location corresponding to the connected component is a pore or a blackhead, wherein the degree of circularity represents a degree of similarity between a shape of the connected component and a circle, and wherein the internal-external color variation value is a difference or a ratio between an internal pixel value and an external pixel value corresponding to the connected component at a second location of the region of interest.

13. The skin detection method of claim 1, further comprising:
processing an image corresponding to identified pores to obtain a quantized pore indicator, wherein the quantized pore indicator comprises at least one of a pore area ratio, a pore density, an average pore internal-external color variation value, or a ratio of a pore internal-external color variation value-weighted area, wherein the pore area ratio is a first ratio of a total area of the pores to an area of the region of interest, wherein the pore density is a second ratio of a quantity of the pores to the area, wherein the average pore internal-external color variation value is an average value of internal-external color variation values of the pores, and wherein the ratio of the pore internal-external color variation value-weighted area is a third ratio of the area to a sum from adding all values based on multiplying an internal-external color variation value of each of the pores by a corresponding area;
calculating a quantized pore score of the region of interest based on the quantized pore indicator; and
displaying the quantized pore score.

14. The skin detection method of claim 1, further comprising:
processing an image corresponding to identified blackheads to obtain a quantized blackhead indicator, wherein the quantized blackhead indicator comprises at least one of a blackhead area ratio, a blackhead density, an average blackhead internal-external color variation value, or a ratio of a blackhead internal-external color variation value-weighted area, wherein the blackhead area ratio is a first ratio of a total area of the blackheads to an area of the region of interest, wherein the blackhead density is a second ratio of a quantity of the blackheads to the area, wherein the average blackhead internal-external color variation value is an average value of internal-external color variation values of the blackheads, and wherein the ratio of the blackhead internal-external color variation value-weighted area is a third ratio of the area to a sum based on adding all values from multiplying an internal-external color variation value of each of the blackheads by a corresponding area;
calculating a quantized blackhead score of the region of interest based on the quantized blackhead indicator; and
displaying the quantized blackhead score.

15. An electronic device comprising:
a processor; and
a memory coupled to the processor and configured to store instructions that, when executed by the processor, cause the electronic device to be configured to:
obtain a region of interest in a face image;
divide the region of interest into a highlighted region and a non-highlighted region;
determine a first segmentation threshold of the highlighted region;
determine a second segmentation threshold of the non-highlighted region;
obtain a first binary image of the highlighted region based on the first segmentation threshold;
obtain a second binary image of the non-highlighted region based on the second segmentation threshold;
fuse the first binary image and the second binary image to obtain a fused image; and
identify, based on the fused image, pores, blackheads, or both pores and blackheads in the region of interest.

16. The electronic device of claim 15, wherein the instructions further cause the electronic device to be configured to:
perform first graying processing on the region of interest to obtain a first grayscale image;
perform binarization processing on the first grayscale image to obtain a third binary image;
perform connected component analysis on the third binary image to obtain at least one connected component; and
filter out a first connected component, of the at least one connected component that comprises an area that is less than a first preset threshold to obtain the highlighted region, wherein a region other than the highlighted region in the region of interest is the non-highlighted region.

17. The electronic device of claim 16, wherein the instructions further cause the electronic device to be configured to:
perform grayscale transformation on the region of interest to obtain a second grayscale image;
multiplying each pixel of a plurality of pixels in the region of interest by a respective weight value, of a plurality of weight values, corresponding to the pixel to obtain a multiplied image, wherein each weight value of the plurality of weight values is based on a grayscale value of a respective pixel in the second grayscale image
multiply each pixel of a plurality of pixels in the region of interest by a respective weight value, of a plurality of weight values, corresponding to the pixel to obtain a multiplied image, wherein each weight value of the plurality of weight values is based on a grayscale value of a respective pixel in the second grayscale image;
perform grayscale transformation on the multiplied image to obtain a third grayscale image;
perform min-max normalization on the third grayscale image to obtain a min-max normalized third grayscale image; and
perform grayscale inversion processing on the min-max normalized third grayscale image to obtain the first grayscale image.

18. The electronic device of claim 16, wherein the instructions further cause the electronic device to be configured to:
perform expansion processing, corrosion processing, or both expansion processing and corrosion processing on the third binary image to obtain a processed binary image; and
obtain at least one second connected component in the processed binary image.

19. The electronic device of claim 15, wherein the instructions further cause the electronic device to be configured to:
perform graying processing on the region of interest to obtain a grayscale image;
obtain a plurality of minimum grayscale values of pixels of the grayscale image in the highlighted region and a plurality of neighboring pixels of each of the pixels, wherein a quantity of neighboring pixels is equal to a multiple of 4; and use an average value of the minimum grayscale values as the first segmentation threshold.

20. The electronic device of claim 15, wherein the instructions further cause the electronic device to be configured to:
remove a nose shadow region from the fused image to obtain a fourth image; and
determine, based on the fourth image, the pores, the blackheads, or both the pores and the blackheads in the region of interest.

\* \* \* \* \*

UNITED STATES PATENT AND TRADEMARK OFFICE
CERTIFICATE OF CORRECTION

PATENT NO. : 11,798,162 B2  
APPLICATION NO. : 17/260875  
DATED : October 24, 2023  
INVENTOR(S) : Xin Ding et al.

Page 1 of 1

It is certified that error appears in the above-identified patent and that said Letters Patent is hereby corrected as shown below:

On the Title Page

(71) Applicant: "Honor Device Co., Ltd, Guangdong (CN)" should read "Honor Device Co., Ltd, Shenzhen (CN)"

In the Claims

Claim 7, Column 29, Line 65: "processed image the pores," should read "processed image, the pores,"

Signed and Sealed this  
Second Day of January, 2024

Katherine Kelly Vidal  
*Director of the United States Patent and Trademark Office*